United States Patent
Ramasubramonian et al.

(10) Patent No.: US 11,743,501 B2
(45) Date of Patent: Aug. 29, 2023

(54) HIGH-LEVEL SYNTAX DESIGN FOR GEOMETRY-BASED POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Louis Joseph Kerofsky, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/223,789

(22) Filed: Apr. 6, 2021

(65) Prior Publication Data
US 2021/0321139 A1   Oct. 14, 2021

Related U.S. Application Data

(60) Provisional application No. 63/013,971, filed on Apr. 22, 2020, provisional application No. 63/010,550, (Continued)

(51) Int. Cl.
*H04N 19/70* (2014.01)
*H04N 19/119* (2014.01)
(Continued)

(52) U.S. Cl.
CPC ........... *H04N 19/70* (2014.11); *H04N 19/119* (2014.11); *H04N 19/136* (2014.11); *H04N 19/174* (2014.11); *H04N 19/597* (2014.11)

(58) Field of Classification Search
CPC .... G06T 9/001; H04N 19/174; H04N 19/136; H04N 19/597; H04N 19/70; H04N 19/119
See application file for complete search history.

(56) References Cited

U.S. PATENT DOCUMENTS

2021/0192798 A1* 6/2021 Lasserre .................. G06T 9/40
2021/0407142 A1* 12/2021 Hur ........................ G06T 9/40
(Continued)

OTHER PUBLICATIONS

3DG: "G-PCC Future Enhancements", 128. MPEG Meeting, Oct. 7, 2019-Oct. 11, 2019, Geneva, CH (Motion Picture Expert Group or ISO/IEC JTC1/SC29/WG11), No. n18887, Dec. 23, 2019 (Dec. 23, 2019), XP030225587, Retrieved from the Internet: URL: http://phenix.int-evry.fr/mpeg/doc_end_user/documents/128_Geneva/wg11/w18887.zip.w18887/w18887 G-PCC-Future Enhancements_d12_clean.docx. [retrieved on Dec. 23, 2019], 277 pp.
(Continued)

*Primary Examiner* — Neil R Mikeska
(74) *Attorney, Agent, or Firm* — Shumaker & Sieffert, P.A.

(57) ABSTRACT

An example device for decoding point cloud data includes memory configured to store the point cloud data and one or more processors implemented in circuitry and coupled to the memory. The one or more processors are configured to determine dimensions of a region box and determine dimensions of a slice bounding box. The one or more processors are also configured to decode a slice of the point cloud data associated with the slice bounding box. The dimensions of the region box are constrained to not exceed the dimensions of the slice bounding box.

12 Claims, 9 Drawing Sheets

Related U.S. Application Data filed on Apr. 15, 2020, provisional application No. 63/006,660, filed on Apr. 7, 2020.

(51) Int. Cl.
*H04N 19/597* (2014.01)
*H04N 19/136* (2014.01)
*H04N 19/174* (2014.01)

(56) References Cited

U.S. PATENT DOCUMENTS

| | | | | |
|---|---|---|---|---|
| 2022/0141487 A1* | 5/2022 | Oh | | H04N 21/4402 375/240.08 |
| 2022/0159284 A1* | 5/2022 | Hur | | G06T 9/001 |
| 2022/0159310 A1* | 5/2022 | Oh | | H04N 19/184 |

OTHER PUBLICATIONS

Dean (Panasonic) H.C., et al., "[G-PCC] EE13.5 Report on Region-Wise Quantization Control", 128. MPEG Meeting; Oct. 7, 2019-Oct. 11, 2019, Geneva, CH, (Motion Picture Expert Group or ISO/IEC JTC1/SC29/WG11), No. m51063, Oct. 4, 2019 (Oct. 4, 2019), 6 Pages, XP030221574, Retrieved from the Internet: URL: http://phenix.int-evry.fr/mpeg/doc_end_user/documents/128_Geneva/wg11/m51063-v1-m51063_EE13.5_report.zip m51063-EE13.5-report/m51063_[G-PCC] EE13.5-Report.docx [retrieved on Oct. 4, 2019] Section 1; Section 2.1; Section 3; Fig. 1.

Dean (Panasonic) H.C., et al., "[G-PCC] Region-Wise Quantization Control in Attribute Coding", 127. MPEG Meeting, Jul. 8, 2019-Jul. 12, 2019, Gothenburg, SE, (Motion Picture Expert Group or ISO/IEC JTC1/SC29/WG11), No. m49626, Jul. 7, 2019 (Jul. 7, 2019), 5 Pages, XP030208019, Retrieved from the Internet: URL: http://phenix.int-evry.fr/mpeg/doc_end_user/documents/127_Gothenburg/wg11/m49626-v1-m49626_[G-PCC]_Region-wiseQPControl.zip m49626_[G-PCC]_Region-wiseQPControl/m49626_[G-PCC] Region-wise QP Contral.docx [retrieved on Jul. 7, 2019].

"G-PCC Improvements", 127. MPEG Meeting; Jul. 8, 2019-Jul. 12, 2019, Gothenburg; (Motion Picture Expert Group or ISO/IEC JTC1/SC29/WG11), No. n18669, Sep. 30, 2019 (Sep. 30, 2019), 112 Pages, XP030221913, Retrieved from the Internet: URL: http://phenix.int-evry.fr/mpeg/doc_end_user/documents/127_Gothenburg/wg11/w18669-zip w18669/w18669_GPCC_Improvement_d4.docx [retrieved on—Sep. 30, 2019].

"Information Technology—Coding—Independent Code Points—Part 2: Video", International Standard, ISO/IEC 23091-2, First Edition, Jul. 2019, 34 pages.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

Mammou (3DG) K., et al., "PCC Test Model Category C13 v2", 122. MPEG Meeting, Apr. 16, 2018-Apr. 20, 2018, San Diego, USA, (Motion Picture Expert Group or ISO/IEC JTC1/SC29/WG11), No. n17519, Jul. 16, 2018 (Jul. 16, 2018), 13 Pages, XP030264089, Retrieved from the Internet: URL: http://phenix.int-evry.fr/mpeg/doc_end_user/documents/122_San%20Diego/wg11/w17519.zip w17519.docx [retrieved on Jul. 16, 2018].

Partial International Search Report—PCT/US2021/026246—ISA/EPO—dated Jul. 5, 2021.

Ramasubramonian (Qualcomm Inc) A.K., et al., "[G-PCC][New Proposal] General HLS Improvements", International Organisation For Standardisation Organisation Internationale De Normalisation ISO/IEC JTC1/SC29/WG11 Coding of Moving Pictures and Audio, ISO/IEC JTC1/SC29/WG11 MPEG2020/M53658, Apr. 2020, Alpbach, AT, 8 Pages.

Ramasubramonian (Qualcomm Inc) A.K., et al., "[G-PCC][New Proposal] Geometry-Related HLS Refinements to G-PCC", International Organisation For Standardisation Organisation Internationale De Normalisation ISO/IEC JTC1/SC29/WG11 Coding of Moving Pictures and Audio, ISO/IEC JTC1/SC29/WG11 MPEG2020/M53655, Apr. 2020, Alpbach, AT, 4 Pages.

Ray B., et al., "[G-PCC][new] Attribute Related High Level Syntax—Fixes and Improvements", Coding of Moving Pictures and Audio, ISO/IEC JTC1/SC29/WG11, MPEG2020/M53652, Alpbach, AT, Apr. 2020, 17 pages.

International Search Report and Written Opinion—PCT/US2021/026246—ISA/EPO—dated Dec. 14, 2021 26 Pages.

Ray (Qualcomm) B., et al., "[G-PCC] High Level Syntax Cleanup of G-PCC", 129, MPEG Meeting, Jan. 13, 2020-Jan. 17, 2020, Brussels, (Motion Picture Expert Group or ISO/IEC JTC1/SC29/WG11), No. m52342, Jan. 14, 2020, XP030224976, 12 Pages.

G-PCC DIS, ISO/IEC JTC1/SC29/WG11 w19088, Brussels, Belgium, Jan. 2020, 127 pp.

G-PCC Codec Description v6, ISO/IEC JTC1/SC29/WG11 w19091, Brussels, Belgium, Jan. 2020, 91 pp.

\* cited by examiner

HIGH-LEVEL SYNTAX DESIGN FOR GEOMETRY-BASED POINT CLOUD COMPRESSION This application claims priority to U.S. Provisional Patent Application No. 63/006,660, filed on Apr. 7, 2020, U.S. Provisional Patent Application No. 63/010,550, filed on Apr. 15, 2020, and U.S. Provisional Patent Application No. 63/013,971, filed on Apr. 22, 2020, the entire contents of each of which is incorporated by reference.

TECHNICAL FIELD

This disclosure relates to point cloud encoding and decoding.

SUMMARY

In general, this disclosure describes several techniques for high-level syntax design for geometry-based point cloud compression (G-PCC). These techniques may address a number of potential issues in G-PCC coding.

In one example, this disclosure describes a method of decoding point cloud data including determining dimensions of a region box, determining dimensions of a slice bounding box, and decoding a slice of the point cloud data associated with the slice bounding box, wherein the dimensions of the region box are constrained to not exceed the dimensions of the slice bounding box.

In another example, this disclosure describes a method of decoding point cloud data determining a first slice identifier (ID) of a first geometry slice associated with a frame of the point cloud data, determining a second slice ID of a second geometry slice associated with the frame of the point cloud data, based on the second slice ID being equal to the first slice ID, determining the second slice to contain identical content to the first slice, and decoding the point cloud data based on the first slice ID.

In another example, this disclosure describes a method of decoding point cloud data determining whether an attribute dimension of an attribute is greater than 1, based on the attribute dimension being greater than 1, parsing an attribute slice header syntax element indicative of a delta quantization parameter, and decoding the point cloud data based on the delta quantization parameter.

In another example, this disclosure describes a device comprising memory configured to store point cloud data and one or more processors implemented in circuitry and communicatively coupled to the memory, the one or more processors being configured to determine dimensions of a region box, determine dimensions of a slice bounding box, and decode a slice of the point cloud data associated with the slice bounding box, wherein the dimensions of the region box are constrained to not exceed the dimensions of the slice bounding box.

In another example, this disclosure describes a device comprising memory configured to store point cloud data and one or more processors implemented in circuitry and communicatively coupled to the memory, the one or more processors being configured to determine a first slice identifier (ID) of a first geometry slice associated with a frame of the point cloud data, determine a second slice ID of a second geometry slice associated with the frame of the point cloud data, based on the second slice ID being equal to the first slice ID, determine the second slice to contain identical content to the first slice, and decode the point cloud data based on the first slice ID.

In another example, this disclosure describes a device comprising memory configured to store point cloud data and one or more processors implemented in circuitry and communicatively coupled to the memory, the one or more processors being configured to determine whether an attribute dimension of an attribute is greater than 1, based on the attribute dimension being greater than 1, parse an attribute slice header syntax element indicative of a delta quantization parameter, and decode the point cloud data based on the delta quantization parameter.

The details of one or more examples are set forth in the accompanying drawings and the description below. Other features, objects, and advantages will be apparent from the description, drawings, and claims.

DETAILED DESCRIPTION

Figure 1:
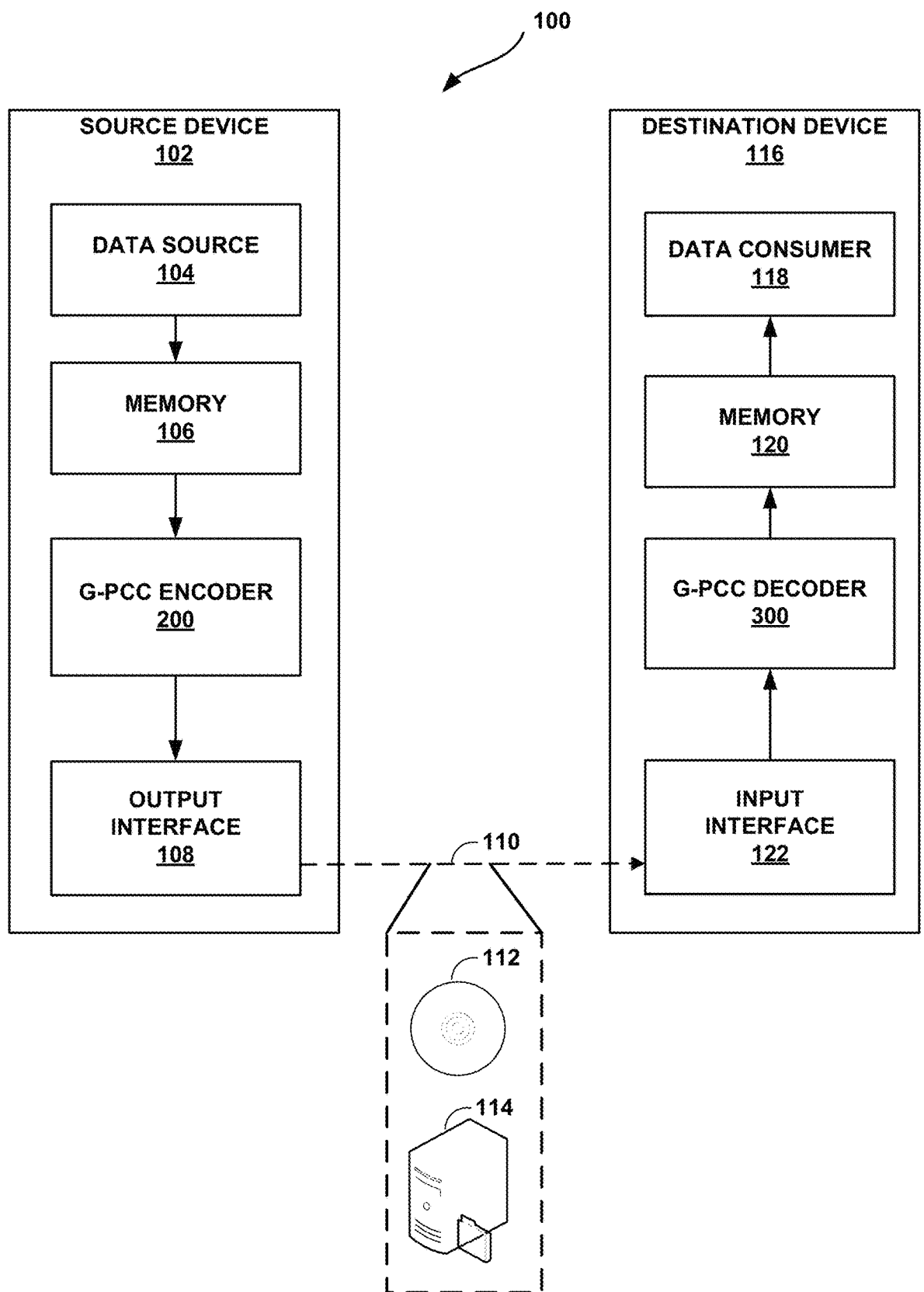
FIG. 1 is a block diagram illustrating an example encoding and decoding system that may perform the techniques of this disclosure.

In certain draft standards for geometry-based point cloud compression (G-PCC), issues may exist with high-level syntax. For example, dimensions of a region box may exceed the dimensions of a slice that contains the region. In such a case, signaling the region width, height, and depth that may exceed the dimensions of the slice may not add value because there are no points in the slice that exceed the slice bounding box. This may unnecessarily increase signaling overhead and waste processing power on both a G-PCC encoder and G-PCC decoder.

In another example, there may be no restriction on the range of a syntax element indicative of the size of a trisoup node. When this syntax element exceeds the dimensions of a slice, this may lead to the generation of negative values of a variable indicative of the maximum geometry octree depth, which may be undesirable as this condition may lead to decoding errors.

In another example, there is no restriction on a slice ID that may be assigned to a geometry slice. For example, two different geometry slices in a point cloud frame may be assigned the same slice ID, even if they contain different content. This may be undesirable as this condition may lead to ambiguities that may cause decoding errors.

In another example, some parameters are not applicable to a one-dimensional attribute. However, the parameters may still be present and may still need to be signaled. This may lead to an unnecessary increase in signaling overhead and waste processing power on both a G-PCC encoder and G-PCC decoder.

In another example, each slice may only be able to specify one region where a delta quantization parameter may be applied. It may be more desirable to enable the flexibility of having a plurality of regions where the delta quantization parameter may be applied. Only having the ability to specify one single region where a delta quantization parameter may be applied may constrain the choice of coding the point cloud in an efficient manner and/or in a manner that is takes into consideration a perceptual quality of the point cloud.

In another example, there may be no restriction on the value range of a geometry parameter set ID in a geometry slice header, while there may be a restriction on the value range of a geometry parameter set ID in a geometry parameter set. This condition may lead to an unnecessary increase in signaling overhead and waste processing power on both a G-PCC encoder and G-PCC decoder in the case where the value of the geometry parameter set ID in the geometry slice header is larger than that of the geometry parameter set ID in the geometry parameter set. This condition may also lead to ambiguities that may cause decoding errors.

In yet another example, there may be no restriction on the value range of a attribute parameter set ID in an attribute slice header, while there may be a restriction on the value range of an attribute parameter set ID in an attribute parameter set. This condition may lead to an unnecessary increase in signaling overhead and waste processing power on both a G-PCC encoder and G-PCC decoder in the case where the value of the attribute parameter set ID in the attribute slice header is larger than that of the attribute parameter set ID in the attribute parameter set. This condition may also lead to ambiguities that may cause decoding errors.

According to the techniques of this disclosure, the above issues and other issues in high-level syntax design with G-PCC coding may be addressed as discussed in more detail below. By addressing these issues, signaling overhead may be reduced, processing power may be saved, decoding errors may be reduced, and/or better reproduction of the point cloud at a decoder may be achieved.

FIG. 1 is a block diagram illustrating an example encoding and decoding system 100 that may perform the techniques of this disclosure. The techniques of this disclosure are generally directed to coding (encoding and/or decoding) point cloud data. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to high level syntax for geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to high level syntax for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard of a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling"

may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
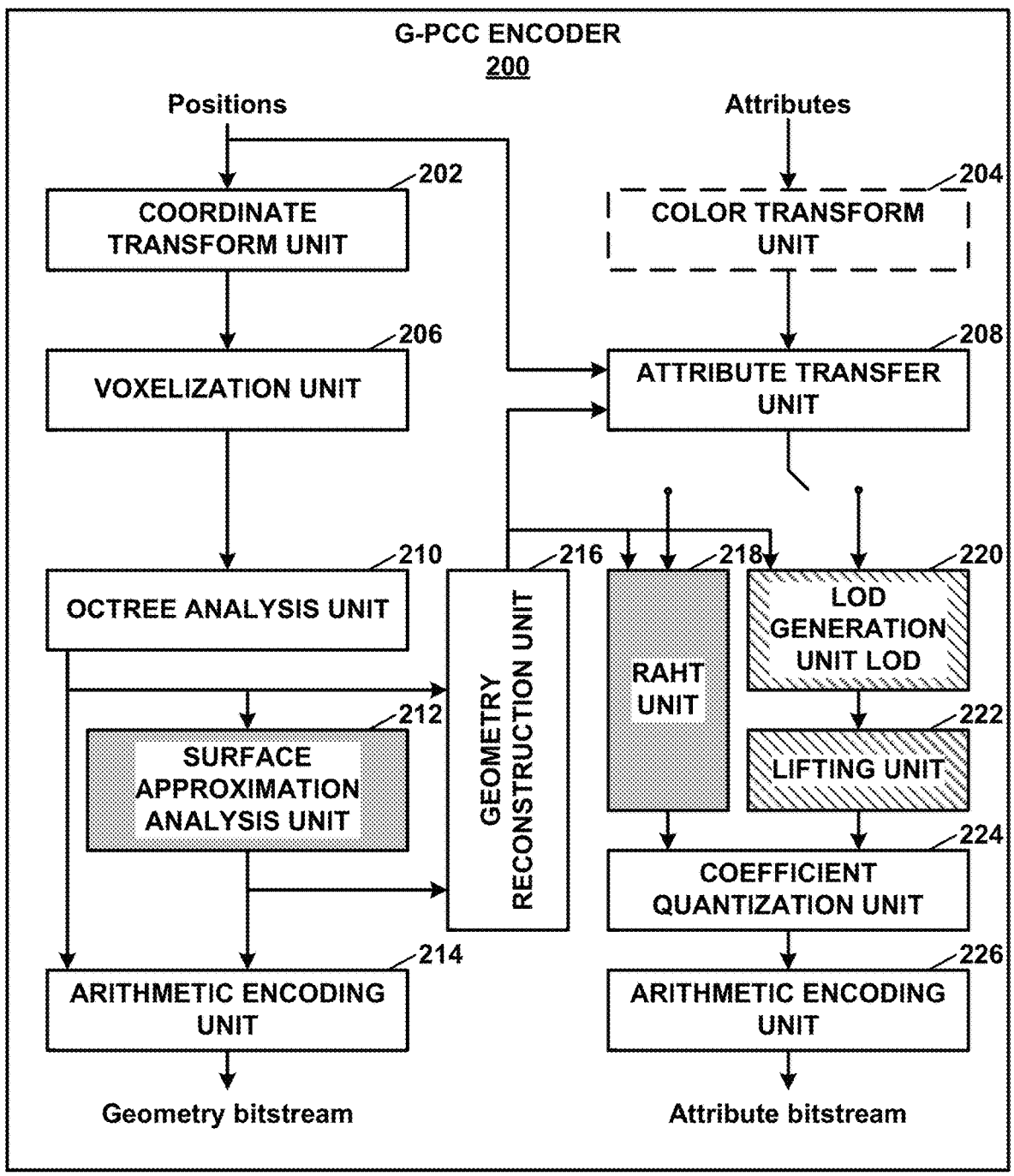
FIG. 2 is a block diagram illustrating an example Geometry Point Cloud Compression (G-PCC) encoder.
Figure 3:
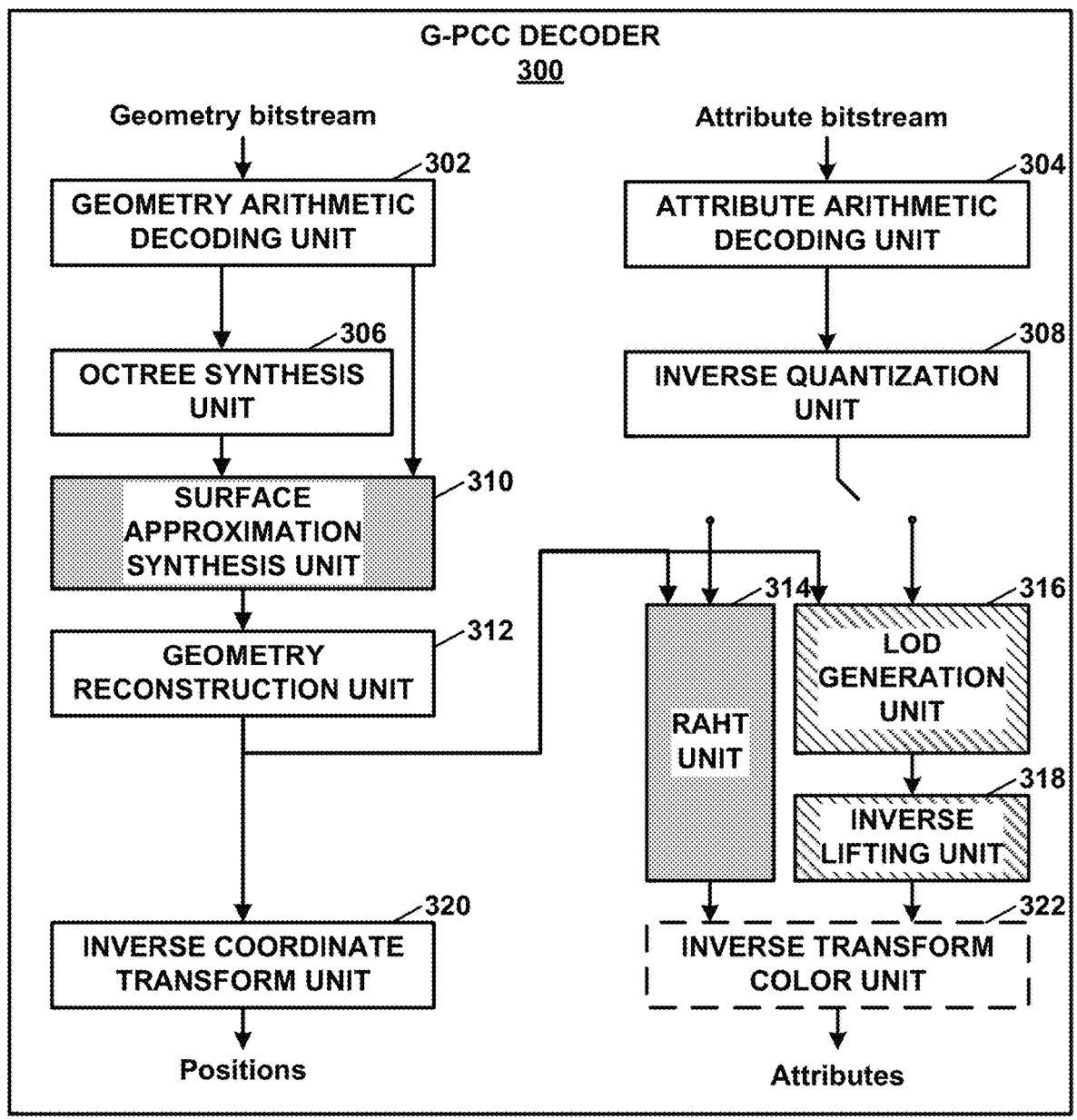
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residual obtained as the output of the coding methods for the attributes are quantized. The quantized residual may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LoD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Non-normative quantization and scaling in G-PCC is now described. An original point cloud may be represented in a floating-point format or at a very high bit depth. Voxelization unit 206 may quantize and voxelize the input point cloud at a certain bit depth. G-PCC encoder 200 may apply the quantization for the purpose of voxelization, and a scaling may be performed at the decoder side, e.g., by G-PCC decoder 300, mainly for the mapping of the decoded point cloud (e.g., in voxels unit) in an application specific physical space (e.g., in a physical dimension). G-PCC decoder 300 may use a scale value for this operation that is signaled by G-PCC encoder 200 using the syntax elements sps_source_scale_factor_numerator_minus1 and sps_source_scale_factor_denominator_minus1. The quantization process being a pre-processing step (prior to encoding) and the scaling process being a post-processing step (after decoding) does not impact the overall coding process. Rather, the quantization process and scaling process are non-normative in nature.

| | |
|---|---|
| sps_source_scale_factor_numerator_minus1 | ue(v) |
| sps_source_scale_factor_denominator_minus1 | ue(v) |

For purposes of this disclosure, at the encoder side (e.g., G-PCC encoder 200), the point cloud before the non-normative quantization will be referred to as an "unquantized point cloud" and the point cloud after the non-normative quantization will be referred to as a "quantized point cloud." This quantization is not related to the quantization that may be done by a G-PCC codec as part of the encoding or decoding process. Similarly, the output of the G-PCC decoder (e.g., G-PCC decoder 300) is referred to as a quantized point cloud; the output of any non-normative scaling at the decoder-side is referred to as an unquantized point cloud. It is again noted that the output of the G-PCC decoder (e.g., G-PCC decoder 300) may be the result of normative scaling operations.

Bounding boxes in G-PCC are now described. Similar to the notion of picture width and height in images and in video, point clouds also have a notion of a bounding box whereby all the points in a point cloud are considered to be present within the bounding box. In other words, a bounding box is defined such that it contains all the points in the point cloud.

A source bounding box is now described. At the time of capture or generation of a point cloud, a bounding box may be specified to capture all the points of a point cloud. For example, source device 102 may specify the bounding box. This bounding box may be referred to as the source bounding box. In G-PCC, a sequence parameter set (SPS) bounding box syntax element (e.g., seq_bounding_box_present_flag) is specified that may be indicative of the source bounding box. For the purpose of this disclosure, the SPS bounding box may be referred to as the source bounding box. The units used to describe the source bounding box are not defined in G-PCC. A given application may therefore determine these units. The syntax and semantics associated with the SPS bounding box are provided below.

It is presumed (because this behavior is not defined in the G-PCC standard) that the output of G-PCC decoder 300 will be scaled using a source scale factor (derived from sps_source_scale_factor_numerator_minus1 and sps_source_scale_factor_denominator_minus1) and the output of this (non-normative) scaling is contained within the SPS bounding box. For example, an application, a separate device, or a G-PCC decoder device itself may scale the output of G-PCC decoder 300. In some examples, G-PCC decoder 300 may parse the scale factor syntax elements. In other examples, the application or separate device may parse the scale factor syntax elements.

Source Bounding Box-Related Syntax

| seq_parameter_set( ) { | Descriptor |
|---|---|
| main_profile_compatibility_flag | u(1) |
| reserved_profile_compatibility_2bits | u(22) |
| [Ed. assign bits from this when there is a profile defined] | |
| unique_point_positions_constraint_flag | u(1) |
| level_idc | u(8) |
| sps_seq_parameter_set_id | ue(v) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_offset_log2_scale | ue(v) |
| sps_bounding_box_size_width | ue(v) |
| sps_bounding_box_size_height | ue(v) |
| sps_bounding_box_size_depth | ue(v) |
| } | |
| sps_source_scale_factor_numerator_minus1 | ue(v) |
| sps_source_scale_factor_denominator_minus1 | ue(v) |
| sps_num_attribute_sets | ue(v) |
| for( i = 0; i< sps_num_attribute_sets; i++ ) { | |

Source bounding box-related semantics are as follows:

main_profile_compatibility_23bitsflag equal to 1 specifies that the bitstream conforms to the Main profile. main_profile_compatibility_flag equal to 0 specifies that the bitstream conforms to a profile other than the Main profile.

reserved_profile_compatibility_22 shall be equal to 0 in bitstreams conforming to this version of this Specification. Other values for reserved_profile_compatibility_22bits are reserved for future use by ISO/JEC. Decoders shall ignore the value of reserved_profile_compatibility_2bits.

unique_point_positions_constraint_flag equal to 1 indicates that in each point cloud frame that refers to the current SPS, all output points have unique positions. unique_point_positions_constraint_flag equal to 0 indicates that in any point cloud frame that refers to the current SPS, two and more output points may have the same position.

Note—For example, even if all points are unique in each slices [sic], the points from different slices in a frame may overlap. In that case, unique_point_positions_constraint_flag should be set to 0.

level_idc indicates a level to which the bitstream conforms as specified in Annex A. Bitstreams shall not contain values of level_idc other than those specified in Annex A. Other values of level_idc are reserved for future use by ISO/JEC.

sps_seq_parameter_set_id provides an identifier for the SPS for reference by other syntax elements. The value of sps_seq_parameter_set_id shall be 0 in bitstreams conforming to this version of this Specification. The value other than 0 for sps_seq_parameter_set_id is reserved for future use by ISO/JEC.

sps_bounding_box_present_flag equal to 1 indicates that a bounding box. sps_bounding_box_present_flag equal to 0 indicates that the size of the bounding box is undefined.

sps_bounding_box_offset_x, sps_bounding_box_offset_y, and sps_bounding_box_offset_z indicate quantised x, y, and z offsets of the source bounding box in Cartesian coordinates. When not present, the values of sps_bounding_box_offset_x, sps_bounding_box_offset_y, and sps_bounding_box_offset_z are each inferred to be 0.

sps_bounding_box_offset_log 2_scale indicates the scaling factor to scale the quantised x, y, and z source bounding box offsets. When not present, the value of sps_bounding_box_offset_log 2_scale is inferred to be 0.

sps_bounding_box_size_width, sps_bounding_box_size_height, and sps_bounding_box_size_depth indicate the width, height, and depth of the source bounding box in Cartesian coordinates.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

Tile bounding boxes are now described. In addition to the source bounding box, G-PCC also specifies tile bounding boxes. Tile bounding boxes are associated with the points of a tile. The tile bounding boxes are signaled in the tile_inventory( ) syntax. Each tile_inventory( ) syntax structure is associated with a frame specified by tile_frame_idx.

Tile Inventory Syntax

| tile_inventory( ) { | Descriptor |
|---|---|
| tile_frame_idx | ? |
| num_tiles_minus1 | u(16) |
| for( i = 0; i <= num_tiles_minus1; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| } | |
| byte_alignment( ) | |
| } | |

Tile inventory semantics are as follows:

num_tiles_minus1 plus 1 specifies the number of tile bounding boxes present in the tile inventory.

tile_bounding_box_offset_x[i], tile_bounding_box_offset_y[i], and tile_bounding_box_offset_z[i] indicate the x, y, and z offsets of the i-th tile in cartesian coordinates.

tile_bounding_box_size_width[i], tile_bounding_box_size_height[i], and tile_bounding_box_size_depth[i] indicate the width, height, and depth of the i-th tile in the Cartesian coordinates.

Slice bounding boxes are now described. Although a bounding box is not explicitly specified for slices, a box may be specified that includes the points in a slice. The specification of the slice bounding box includes a slice origin that specifies one corner of the slice bounding box and the width, height and depth of the slice bounding box.

The Geometry parameter set (GPS) includes an indication of whether an explicit slice origin is signaled for slices. If an explicit slice origin is present, G-PCC encoder 200 may signal an associated scale value at the GPS or at the Geometry slice header (GSH). When an explicit slice origin is not signaled, G-PCC decoder 300 infers the slice origin to be equal to (0, 0, 0). Slice bounding box syntax is shown below.

Slice (Bounding) Box-Related Syntax

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if( gps_box_present_flag ){ | |

| geometry_parameter_set( ) { | Descriptor |
|---|---|
| gps_gsh_box_log2_scale_present_flag | u(1) |
| if( gps_gsh_box_log2_scale_present_flag == 0 ) | |
| gps_gsh_box_log2_scale | ue(v) |
| } | |
| unique_geometry_points_flag | u(1) |

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
| if( gps_gsh_box_log2_scale_present_flag ) | |
| gsh_box_log2_scale | ue(v) |
| gsh_box_origin_x | ue(v) |
| gsh_box_origin_y | ue(v) |
| gsh_box_origin_z | ue(v) |
| } | |
| if ( gps_implicit_geom_partition_flag ) { | |
| gsh_log2_max_nodesize_x | ue(v) |
| gsh_log2_max_nodesize_y_minus_x | se(v) |
| gsh_log2_max_nodesize_z_minus_y | se(v) |
| } else { | |
| gsh_log2_max_nodesize | ue(v) |
| } | |
| _minus1   if( geom_scaling_enabled_flag ) { | |
| [Ed: this should be last in the gsh?] | |

Slice (bounding) box-related semantics are now described. The following are the semantics of the relevant syntax elements in the Geometry parameter set:

gps_geom_parameter_set_id provides an identifier for the GPS for reference by other syntax elements. The value of gps_seq_parameter_set_id shall be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

gps_box_present_flag equal to 1 specifies an additional bounding box information is provided in a geometry header that references the current GPS.

gps_bounding_box_present_flag equal to 0 specifies that additional bounding box information is not signaled in the geometry header.

gps_gsh_box_log 2_scale_present_flag equal to 1 specifies gsh_box_log 2_scale is signaled in each geometry slice header that references the current GPS.

gps_gsh_box_log 2_scale_present_flag equal to 0 specifies gsh_box_log 2_scale is not signaled in each geometry slice header and common scale for all slices is signaled in gps_gsh_box_log 2_scale of current GPS.

gps_gsh_box_log 2_scale indicates the common scale factor of bounding box origin for all slices that references the current GPS.

The following are the semantics of the relevant syntax elements in the Geometry slice header:

gsh_geometry_parameter_set_id specifies the value of gps_geom_parameter_set_id of the active GPS.

gsh_tile_id specifies the value of the tile id that is referred to by the GSH. The value of gsh_tile_id shall be in the range of 0 to XX, inclusive.

gsh_slice_id identifies the slice header for reference by other syntax elements. The value of gsh_slice_id shall be in the range of 0 to XX, inclusive.

frame_idx specifies the log 2_max_frame_idx+1 least significant bits of a notional frame number counter. Consecutive slices with differing values of frame_idx form parts of different output point cloud frames. Consecutive slices with identical values of frame_idx without an intervening frame boundary marker data unit form parts of the same output point cloud frame.

gsh_num_points specifies the maximum number of coded points in the slice. It is a requirement of bitstream conformance that gsh_num_points is greater than or equal to the number of decoded points in the slice.

gsh_box_log 2_scale specifies the scaling factor of bounding box origin for the slice.

gsh_box_origin_x specifies the x value of bounding box origin that scaled by gsh_box_log 2_scale value.

gsh_box_origin_y specifies the y value of bounding box origin that scaled by gsh_box_log 2_scale value gsh_box_origin_z specifies the z value of bounding box origin that scaled by gsh_box_log 2_scale value.

The variable slice_origin_x, slice_origin_y, and slice_origin_z are derived as follows:

```
If gps_gsh_box_log2_scale_present_flag is equal to 0,
    originScale is set equal to gsh_box_log2_scale
Otherwise ( gps_gsh_box_log2_scale_present_flag is equal to 1),
    originScale is set equal to gps_gsh_box_log2_scale
If gps_box_present flag is equal to 0,
    the value of slice_origin_x and slice_origin_y and slice_origin_z
are inferred to be 0.
```

Otherwise (gps_box_present_flag is equal to 1), the following applies:

slice_origin_x=gsh_box_origin_x<<originScale slice_origin_y=gsh_box_origin_x<<originScale slice_origin_z=gsh_box_origin_x<<originScale gsh_log 2_max_nodesize_x specifies the bounding box size in the x dimension, i.e., MaxNodesizeXLog 2 that is used in the decoding process as follows.

MaxNodeSizeXLog 2=gsh_log 2_max_nodesize_x

MaxNodeSizeX=1<<MaxNodeSizeXLog 2 gsh_log 2_max_nodesize_y_minus_x specifies the bounding box size in the y dimension, i.e., MaxNodesizeY-Log 2 that is used in the decoding process as follows:

```
MaxNodeSizeYLog2 = gsh_log2_max_nodesize_y minus_x +
MaxNodeSizeXLog2.
    MaxNodeSizeY = 1 << MaxNodeSizeYLog2.
``` gsh_log 2_max_nodesize_z_minus_y specifies the bounding box size in the z dimension, i.e., MaxNode-sizeZLog 2 that is used in the decoding process as follows.

```
MaxNodeSizeZLog2 = gsh_log2_max_nodesize_z_minus_y +
MaxNodeSizeYLog2
    MaxNodeSizeZ =1 << MaxNodeSizeZLog2
```

If gps_implicit_geom_partition_flag equals to 1, gsh_log 2_max_nodesize is derived as follows.

```
gsh_log2_max_nodesize = max{ MaxNodeSizeXLog2,
    MaxNodeSizeYLog2, MaxNodeSizeZLog2}
``` gsh_log 2_max_nodesize specifies the size of the root geometry octree node when gps_implicit_geom_partition_flag is equal to 0. The variables MaxNodeSize, and MaxGeometryOctreeDepth are derived as follows.

```
MaxNodeSize = 1 << gsh_log2_max_nodesize
MaxGeometryOctreeDepth = gsh_log2_max_nodesize -
log2_trisoup_node_size
```

The variables K and M are then updated as follows.

```
gsh_log2_min_nodesize = min{MaxNodeSizeXLog2,
MaxNodeSizeYLog2, MaxNodeSizeZLog2}
    if (K > (gsh_log2_max_nodesize - gsh_log2_min_nodesize))
        K = gsh_log2_max_nodesize - gsh_log2_min_nodesize;
    if (M > gsh_log2_min_nodesize)
        M = gsh_log2_min_nodesize;
    if (gsh_log2_max_nodesize = = gsh_log2_min_nodesize)
        M = 0;
    if (log2_trisoup_node_size != 0) {
        K = gsh_log2_max_nodesize - gsh_log2_min_nodesize;
        M = 0;
    }
```

Region boxes are now described. In addition to the bounding boxes specified above, G-PCC also supports the signaling of a region box that is used to indicate a modified QP value to the attributes of a particular region of the point cloud. Typically, the QP value associated with an attribute may be specified in the attribute slice header (in addition to some syntax elements in the attribute parameter set). However, certain regions of the point cloud may have peculiar characteristics that may be different from the rest of the slice. For example, a more dense region of the slice may be coded using a finer representation (lower QP) or a more sparse region of the slice may be coded using a coarser representation (higher QP). The region box may be useful for specifying a different QP for attributes of a certain region of a slice. Region box-related syntax follows.

Region Box-Related Syntax

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_attr_qp_delta_luma | se(v) |
| if( | |
| attribute_dimension_minus1[ ash_attr_sps_attr_idx ] > 0 ) | |
| ash_attr_qp_delta_chroma | se(v) |
| } | |
| ash_attr_layer_qp_delta_present_flag | u(1) |
| if ( ash_attr_layer_qp_delta_present_flag ) { | |
| ash_attr_num_layer_qp_minus1 | ue(v) |
| for( i = 0; i < NumLayerQp; i++ ){ | |
| ash_attr_layer_qp_delta_luma[i] | se(v) |

-continued

| attribute_slice_header( ) { | Descriptor |
|---|---|
| if( attribute_dimension_minus1[ ash_attr_sps_attr_idx ] > 0 ) | |
|     ash_attr_layer_qp_delta_chroma[i] | se(v) |
|     } | |
| } | |
| ash_attr_region_qp_delta_present_flag | u(1) |
| if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
| } | |
| byte_alignment( ) | |
| } | |

Region box-related semantics follow:

ash_attr_parameter_set_id specifies the value of the aps_attr_parameter_set_id of the active APS.

ash_attr_sps_attr_idx specifies the order of attribute set in the active SPS. The value of ash_attr_sps_attr_idx shall be in the range of 0 to sps_num_attribute_sets in the active SPS.

ash_attr_geom_slice_id specifies the value of the gsh_slice_id of the active Geometry Slice Header.

ash_attr_layer_qp_delta_present_flag equal to 1 specifies that the ash_attr_layer_qp_delta_luma and ash_attr_layer_qp_delta_chroma syntax elements are present in current ASH. ash_attr_layer_qp_delta_present_flag equal to 0 specifies that the ash_attr_layer_qp_delta_luma and ash_attr_layer_qp_delta_chroma syntax elements are not present in current ASH.

ash_attr_num_layer_qp_minus1 plus 1 specifies the number of layer in which ash_attr_qp_delta_luma and ash_attr_qp_delta_chroma are signaled. When ash_attr_num_layer_qp is not signaled, the value of ash_attr_num_layer_qp is inferred to be 0. The value of NumLayerQp is derived as follows:

NumLayerQp=num_layer_qp_minus1+1 ash_attr_qp_delta_luma specifies the luma delta qp from the initial slice qp in the active attribute parameter set. When ash_attr_qp_delta_luma is not signaled, the value of ash_attr_qp_delta_luma is inferred to be 0.

ash_attr_qp_delta_chroma specifies the chroma delta qp from the initial slice qp in the active attribute parameter set. When ash_attr_qp_delta_chroma is not signaled, the value of ash_attr_qp_delta_chroma is inferred to be 0.

The variables InitialSliceQpY and InitialSliceQpC are derived as follows:

```
InitialSliceQpY = aps_attrattr_initial_qp + ash_attr_qp_delta_luma
InitialSliceQpC = aps_attrattr_initial_qp + aps_attr_chroma_qp_offset + ash_attr_qp_delta_chroma
``` ash_attr_layer_qp_delta_luma specifies the luma delta qp from the InitialSliceQpY in each layer. When ash_attr_layer_qp_delta_luma is not signaled, the value of ash_attr_layer_qp_delta_luma of all layers are inferred to be 0.

ash_attr_layer_qp_delta_chroma specifies the chroma delta qp from the InitialSliceQpC in each layer. When ash_attr_layer_qp_delta_chroma is not signaled, the value of ash_attr_layer_qp_delta_chroma of all layers are inferred to be 0.

The variables SliceQpY[ i ] and SliceQpC[ i ] with i = 0...NumLayerQPNumQPLayer − 1 are derived as follows:

```
for ( i = 0; i < NumLayerQPNumQPLayer; i++) {
    SliceQpY[ i ] = Initial SliceQpY + ash_attr_layer_qp_delta_luma[ i ]
    SliceQpC[ i ] = InitialSliceQpC + ash_attr_layer_qp_delta_chroma[ i ]
}
``` ash_attr_region_qp_delta_present_flag equal to 1 indicates the ash_attr_region_qp_delta and region bounding box origin and size are present in current ASH. ash_attr_region_qp_delta_present_flag equal to 0 indicates the ash_attr_region_qp_delta and region bounding box origin and size are not present in current ASH.

ash_attr_qp_region_box_origin_x indicates the x offset of the region bounding box relative to slice_origin_x. When not present, the value of ash_attr_qp_region_box_origin_x is inferred to be 0.

ash_attr_qp_region_box_origin_y indicates the y offset of the region bounding box relative to slice_origin_y. When not present, the value of ash_attr_qp_region_box_origin_y is inferred to be 0.

ash_attr_qp_region_box_origin_z indicates the z offset of the region bounding box relative to slice_origin_z. When not present, the value of ash_attr_qp_region_box_origin_z is inferred to be 0.

The variable RegionboxX, RegionboxY and RegionboxZ specifying the region box origin are set equal to ash_attr_qp_region_box_origin_x, ash_attr_qp_region_box_origin_y and ash_attr_qp_region_box_origin_z respectively.

ash_attr_qp_region_box_size_width indicates the width of the region bounding box. When not present, the value of ash_attr_qp_region_box_size_width is inferred to be 0.

ash_attr_qp_region_box_size_height indicates the height of the region bounding box. When not present, the value of ash_attr_qp_region_box_size_height is inferred to be 0.

ash_attr_qp_region_box_size_depth indicates the depth of the region bounding box. When not present, the value of ash_attr_qp_region_box_size_depth is inferred to be 0.

The variable RegionboxWidth, RegionboxHeight and RegionboxDepth specifying the region box size are set equal to ash_attr_qp_region_box_size_width, ash_attr_qp_region_box_size_height and ash_attr_qp_region_box_size_depth respectively.

ash_attr_region_qp_delta specifies the delta qp from the SliceQpY[i] and SliceQpC[i] (with i=0 . . . NumLayerQPNumQPLayer−1) of the region specified by ash_attr_qp_region_box. When not present, the value of ash_attr_region_qp_delta is inferred to be 0.

The variable RegionboxDeltaQp specifying the region box delta quantization parameter is set equal to ash_attr_region_qp_delta.

Attribute specific parameter signaling in a sequence parameter set (SPS) is now described. G-PCC encoder 200 may signal the number of attributes associated with the point cloud in an SPS, with a syntax element named sps_num_attribute_sets. For each attribute, G-PCC encoder 200 may signal in the SPS a few attribute specific parameters, such as bit-depth, secondary bit-depth, attribute dimension, attribute type (color, reflectance, frameIndex etc.) and color space related information. The corresponding syntax and semantics are shown below.

| sps_num_attribute_sets | ue(v) |
|---|---|
| for( i = 0; i< sps_num_attribute_sets; i++ ) { | |
|     attribute_dimension_minus1[ i ] | ue(v) |

-continued

```
        attribute_instance_id[ i ]                      ue(v)
    attribute_bitdepth_minus1[i]                         ue(v)
        if(attribute_dimension_minus1[ i ] > 0 )
            attribute_secondary_bitdepth_minus1[ i ]     ue(v)
        attribute_cicp_colour_primaries[ i ]             ue(v)
        attribute_cicp_transfer_characteristics[ i ]     ue(v)
        attribute_cicp_matrix_coeffs[ i ]                ue(v)
        attribute_cicp_video_full_range_flag[ i ]        u(1)
        known_attribute_label_flag[ i ]                  u(1)
        if( known_attribute_label_flag[ i ] )
            known_attribute_label[ i ]                   ue(v)
        else
            attribute_label_four_bytes[ i ]              u(32)
}
``` attribute_dimension_minus1[i] plus 1 specifies the number of components of the i-th attribute.

attribute_instance_id[i] specifies the instance id for the i-th attribute.

NOTE—The value of the attribute_instance_id identifies the attribute when two or more attribute having the attribute_label_four_bytes value is in the bitstream. For example, it is useful for the point cloud having multiple color from the different view point.

attribute_bitdepth_minus1[i] plus 1 specifies the bitdepth for first component of the i-th attribute signal(s).

attribute_secondary_bitdepth_minus1[i] plus 1 specifies the bitdepth for secondary component of the i-th attribute signal(s).

attribute_cicp_colour_primaries[i] indicates the chromaticity coordinates of the colour attribute source primaries of the i-th attribute. The semantics are as specified for the code point ColourPrimaries in ISO/JEC 23091-2.

attribute_cicp_transfer_characteristics[i] either indicates the reference opto-electronic transfer characteristic function of the colour attribute as a function of a source input linear optical intensity $L_c$ with a nominal real-valued range of 0 to 1 or indicates the inverse of the reference electro-optical transfer characteristic function as a function of an output linear optical intensity $L_o$ with a nominal real-valued range of 0 to 1. The semantics are as specified for the code point TransferCharacteristics in ISO/JEC 23091-2.

attribute_cicp_matrix_coeffs[i] describes the matrix coefficients used in deriving luma and chroma signals from the green, blue, and red, or Y, Z, and X primaries. The semantics are as specified for the code point MatrixCoefficients in ISO/JEC 23091-2.

attribute_cicp_video_full_range_flag[i] specifies indicates the black level and range of the luma and chroma signals as derived from E'Y, E'PB, and E'PR or E'R, E'G, and E'B real-valued component signals. The semantics are as specified for the code point VideoFullRangeFlag in ISO/JEC 23091-2.

known_attribute_label_flag[i] equal to 1 specifies know_attribute_label is signaled for the i-th attribute. known_attribute_label_flag[i] equal to 0 specifies attribute_label_four_bytes is signaled for the i-th attribute.

known_attribute_label[i] equal to 0 specifies the attribute is colour. known_attribute_label[i] equal to 1 specifies the attribute is reflectance. known_attribute_label[i] equal to 2 specifies the attribute is frame index.

attribute_label_four_bytes[i] indicates the known attribute type with the 4 bytes code. 7.1 describes the list of supported attributes and their relationship with attribute_label_four_bytes[i].

TABLE 7.1

| attribute_label_four_bytes | |
|---|---|
| attribute_label_four_bytes[ i ] | Attribute type |
| 0 | Color |
| 1 | Reflectance |
| 2 | Frame index |
| 3 | Material ID |
| 4 | Transparency |
| 5 | Normals |
| 6 . . . 255 | Reserved |
| 256 . . . 0xffffffff | unspecified |

The attribute parameter set (APS) is now described. G-PCC syntax allows signaling of a separate parameter set for each attribute. For example, if one point cloud has two different attributes associated with the point cloud, for example color and reflectance, each attribute may have their own APS. An APS contains information about attribute quantization parameters (initial qp, qp offsets etc.), level of detail (LoD) generation-specific parameters, and/or coding tools for attribute coding.

The level of detail (LoD) structure partitions the point cloud into non-overlapping subsets of points referred to as refinement levels $(R_j)_{j=0 \ldots L-1}$, according to a set of Euclidian distances $(d_j)_{j=0 \ldots L-1}$ specified by the user, in a way, that the entire point cloud is represented by the union of all the refinement levels. The level of detail (LoD) l, $LoD_l$, is obtained by taking the union of the refinement levels $R_0$, $R_1, \ldots, R_j$:

$LOD_0 = R_0$
$LOD_1 = LOD_0 \cup R_1 \ldots$
$LOD_j = LOD_{j-1} \cup R_j \ldots$
$LOD_{l+1} = LOD_l \cup R_l$ represents the entire point cloud.

Figure 4:
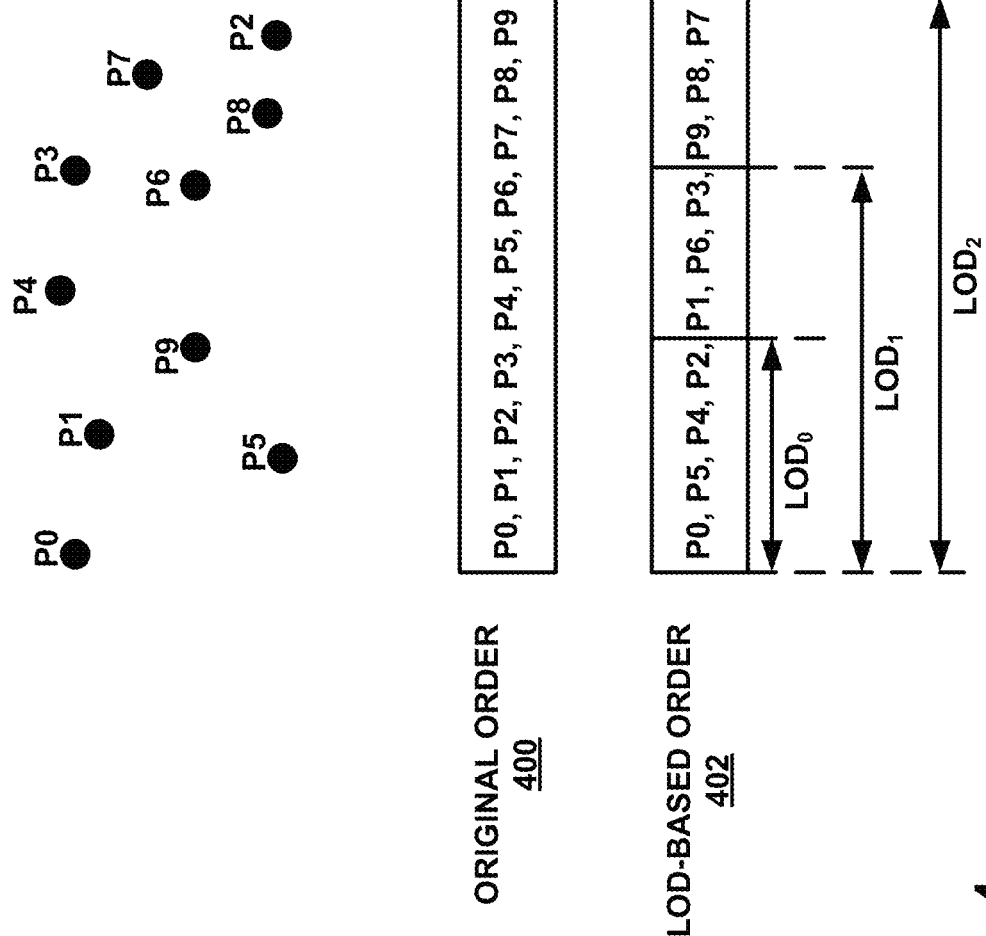
FIG. 4 is a conceptual diagram illustrating an example Level of Details (LoD) generation process.

FIG. 4 is a conceptual diagram illustrating an example Level of Details (LoD) generation process. Original order 400 of the points in the point cloud is depicted in FIG. 4. With LoD, the order of the points may change as shown in LoD-based order 402. For example, $LoD_0$ includes P0, P5, P4, and P2. $LoD_1$ includes P0, P5, P4, P2, P1, P6, and P3. $LoD_2$ includes P0, P5, P4, P2, P1, P6, P3, P9, P8, and P7, which is the entire point cloud of the example of FIG. 4.

Thus, LoD generation provides a scalable representation for the attribute information of a point cloud, where increasing the LoD level results in a progressive increase of the details of attribute information. Additionally, G-PCC decoder 300 performs attribute decoding in LoD order, e.g., first all the points in $LoD_0$ (R0) are decoded, then the points corresponding to refinement level $R_1$ are decoded in order to generate $LoD_1$, and this process may continue further to progressively generate all the LoD. For this reason, a point in an LoD layer can be predicted either from the points in previous LoD layer(s) or, if applicable, from the already decoded points in the same refinement level (e.g., EnableReferringSameLoD=1) as shown in FIG. 5.

Figure 5:
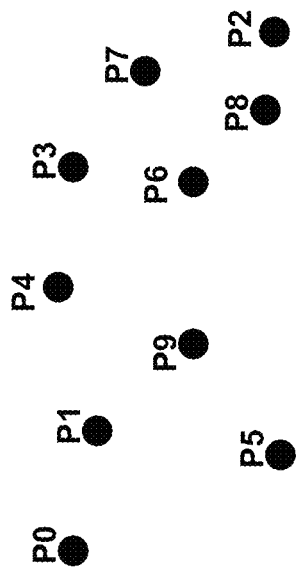
FIG. 5 is a conceptual diagram illustrating example possible point prediction using LoD.
Figure 5:
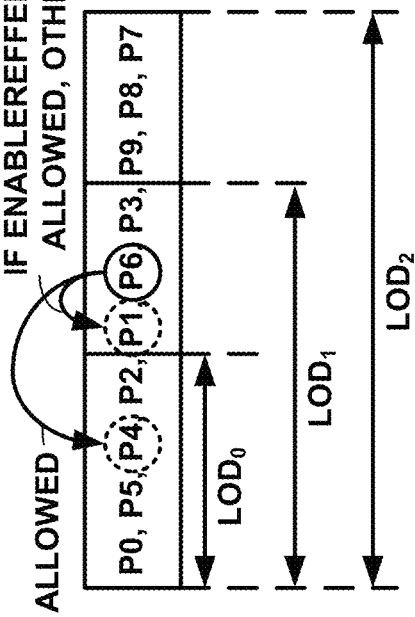

FIG. 5 is a conceptual diagram illustrating possible point prediction using LoD. Original order 500 of the points in the point cloud is depicted. Additionally, LoD-based order 502 is depicted. With LoD, point P4 may be used to predict point P6, as point P4 is in $LoD_0$ which is decoded prior to point P6 which is in $LoD_1$. If EnableReferringSameLoD=1, then point P1 may be used to predict point P6, as point P1 is decoded before point P6. However, if EnableReferringSameLoD=0, then point P1 may not be used to predict point P6.

By using LoD generation, such as with spatial scalability, it may be possible to access a lower resolution point cloud as a thumbnail with less decoder complexity and/or using less bandwidth. When spatial scalability is needed, it may be desirable to decode lower geometry and the corresponding attribute bitstream in a harmonized fashion.

Figure 6:
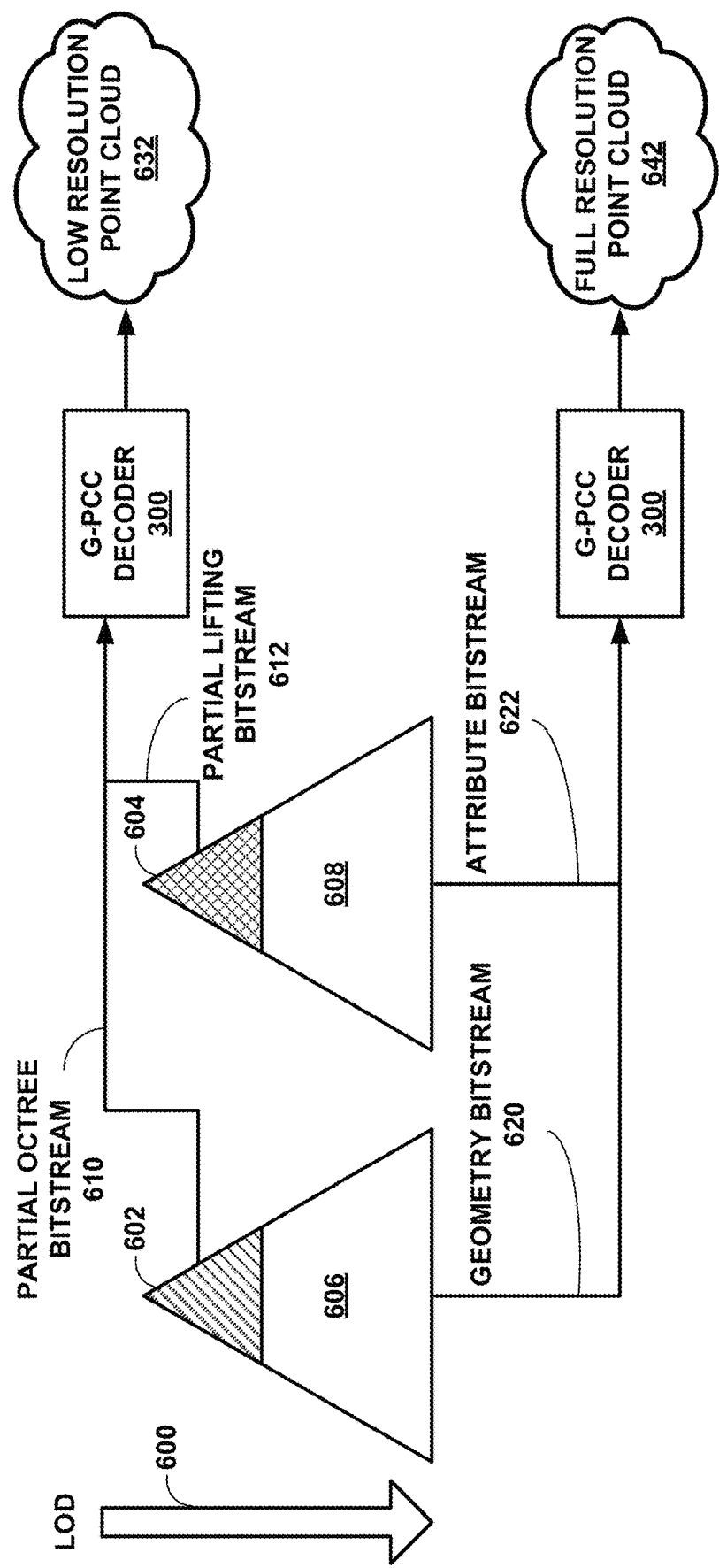
FIG. 6 is a conceptual diagram illustrating an example of G-PCC decoding with different LoD.

FIG. 6 is a conceptual diagram depicting G-PCC decoding with different LoDs. For example, to generate full resolution point cloud 642, G-PCC decoder 300 may utilize a high LoD (e.g., LoD 606 and LoD 608) in both geometry bitstream 620 and the attribute bitstream 622. To generate low resolution point cloud 632, G-PCC decoder 300 may utilize a lower LoD (e.g., LoD 602 and LoD 604) in partial octree bitstream 610 and partial lifting bitstream 612.

To achieve the harmonized spatial scalability, the attribute decoder (e.g., attribute arithmetic decoding unit 304 of FIG. 3) may be extended to decode the lower resolution geometry point cloud (e.g., low resolution point cloud 632) from the partially decoded octree bitstream (e.g., partial octree bitstream 610), where the decoded position of a point in the lower resolution geometry point cloud is quantized as INT (pos/2 k)*2 k.

One or more examples disclosed in this document may be applied independently or combined.

Constraints on region box dimensions are now described. The semantics of the region box in the draft G-PCC standard allow the region box to exceed the dimensions of the slice that contains the region. G-PCC encoder 200, when signaling the region width, height and depth, may use exponential Golomb coding. G-PCC encoder 200 signaling values for these syntax elements that exceed the slice dimensions may not provide any benefit to G-PCC decoder 300 because there are no points that belong to the slice that are outside the slice bounding box. Furthermore, the shape of a slice bounding box is a regular cuboid/cube, and therefore there may be no benefit in G-PCC encoder 200 signaling a region that is larger than the slice bounding box. This also applies to the origin of the region box as the origin of the region box should also be contained within the slice.

Moreover, the signaling of region box dimensions allows the signaling of width, height, or depth to be equal to 0. However, if any of these elements are signaled as zero, the G-PCC draft standard considers the region to be empty.

According to the techniques of this disclosure, constraints may be added such that the region box does not exceed the slice dimensions, or more specifically, the slice bounding box dimensions. For example, G-PCC decoder 300 may determine dimensions of a region box. G-PCC decoder 300 may determine dimensions of a slice bounding box. G-PCC decoder 300 may decode a slice of the point cloud data associated with the slice bounding box. The dimensions of the region box may be constrained to not exceed the dimensions of the slice bounding box.

In some examples, constraints are added such that the origin region box is contained within the slice. In other examples, constraints are added such that no point in the region box is outside the slice, or specifically, outside the slice bounding box.

In some examples, the signaling of the region box width, height and depth are modified such that a value of 0 is disallowed for any of these region box attributes. In other words, G-PCC encoder 200 may not signal a value of 0 for region box width, height or depth.

In an example, the semantics of the syntax elements of the region box are updated so that the region box origin or the region box does not exceed the slice dimensions. The beginning of changes from the draft G-PCC standard ISO/IEC JTC 1/SC 29/WG 11 N18887, are marked <CHANGE> and the end of changes are marked </CHANGE>. The beginning of deletions from the draft G-PCC standard are marked <DELETE> and the end of deletions are marked </DELETE>.

ash_attr_region_qp_delta_present_flag equal to 1 indicates the ash_attr_region_qp_delta and region bounding box origin and size are present in current ASH. ash_attr_region_qp_delta_present_flag equal to 0 indicates the ash_attr_region_qp_delta and region bounding box origin and size are not present in current ASH.

ash_attr_qp_region_box_origin_x indicates the x offset of the region bounding box relative to slice_origin_x. When not present, the value of ash_attr_qp_region_box_origin_x is inferred to be 0.

ash_attr_qp_region_box_origin_y indicates the y offset of the region bounding box relative to slice_origin_y. When not present, the value of ash_attr_qp_region_box_origin_y is inferred to be 0.

ash_attr_qp_region_box_origin_z indicates the z offset of the region bounding box relative to slice_origin_z. When not present, the value of ash_attr_qp_region_box_origin_z is inferred to be 0.

The variable RegionboxX, RegionboxY and RegionboxZ specifying the region box origin are set equal to ash_attr_qp_region_box_origin_x, ash_attr_qp_region_box_origin_y and ash_attr_qp_region_box_origin_z respectively.

ash_attr_qp_region_box_size_width<CHANGE>_minus1 plus 1 </CHANGE> indicates the width of the region bounding box. When not present, the value of ash_attr_qp_region_box_size_width<CHANGE>_minus1 </CHANGE> is inferred to be <CHANGE> −1 </CHANGE> <DELETE>0 </DELETE>.

ash_attr_qp_region_box_size_height<CHANGE>_minus1 plus 1</CHANGE> indicates the height of the region bounding box. When not present, the value of ash_attr_qp_region_box_size_height<CHANGE>_minus1 </CHANGE> is inferred to be <CHANGE>−1 </CHANGE> <DELETE>0 </DELETE>.

ash_attr_qp_region_box_size_depth<CHANGE>_minus1 plus 1</CHANGE> indicates the depth of the region bounding box. When not present, the value of ash_attr_qp_region_box_size_depth<CHANGE>_minus1 </CHANGE> is inferred to be <CHANGE>−1 </CHANGE> <DELETE>0</DELETE>.

The variable RegionboxWidth, RegionboxHeight and RegionboxDepth specifying the region box size are set equal to ash_attr_qp_region_box_size_width, ash_attr_qp_region_box_size_height and ash_attr_qp_region_box_size_depth respectively.

<CHANGE> It is a requirement of bitstream conformance that all the following conditions apply:
   If gps_implicit_geom_partition_flag is equal to 1, the value of (RegionboxX+RegionboxWidth), (RegionboxY+RegionboxHeight) and (RegionBoxZ+RegionboxDepth) shall not exceed MaxNodeSizeX, MaxNodeSizeY and MaxNodeSizeZ, respectively, of the slice.
   Otherwise (gps_implicit_geom_partition_flag is equal to 0), the value of each of (RegionboxX+RegionboxWidth), (RegionboxY+RegionboxHeight) and (RegionBoxZ+RegionboxDepth) shall not exceed MaxNodeSize. </CHANGE> ash_attr_region_qp_delta specifies the delta qp from the SliceQpY[i] and SliceQpC[i] (with i=0 . . . NumLayerQPNumQPLayer−1) of the region specified by ash_attr_qp_region_box. When not present, the value of ash_attr_region_qp_delta is inferred to be 0.

The variable RegionboxDeltaQp specifying the region box delta quantization parameter is set equal to ash_attr_region_qp_delta.

In one example, the following constraints may also be added: It is a requirement of bitstream conformance that all the following conditions apply:

If gps_implicit_geom_partition_flag is equal to 1, the value of RegionboxX, RegionboxY and RegionBoxZ shall not exceed MaxNodeSizeX, MaxNodeSizeY and MaxNodeSizeZ, respectively, of the slice.

Otherwise (gps_implicit_geom_partition_flag is equal to 0), the value of each of RegionboxX, RegionboxY and RegionBoxZ shall not exceed MaxNodeSize.

The presence of tile_inventory( ) syntax and validity of tile_id is now described. The geometry slice header includes a syntax element tile_id that refers to an identifier of the tile associated with the slice. The tile information is provided in the tile_inventory( ), which includes a syntax element frame_idx. The frame_idx may be used to associate the tile_inventory( ) with a particular frame that has the same frame_idx. However, there is no guarantee that a tile_inventory( ) may be present for a particular frame. Moreover, when G-PCC encoder 200 signals the frame_idx with a fixed bit depth, more than one frame may be associated with the same frame_idx. The association of the tile_inventory( ) to a particular frame is unclear. Moreover, when a slice refers a tile_id, the value of the tile_id should belong to a valid range.

According to the techniques of this disclosure, a constraint may be added that specifies that a tile inventory( ) syntax must be associated with each frame. For example, G-PCC encoder 200 may associate a tile_inventory( ) syntax with each frame. In one example, a constraint is added that tile_inventory( ) syntax be signaled, e.g., by G-PCC encoder 200, with each point cloud frame. In another example, a derivation is added such that each frame with a frame index is associated with a tile_inventory( ) with an equivalent frame index value. For example, G-PCC decoder 300 may derive an association between each frame with a frame index and a tile_inventory( ) with an equivalent frame index value.

In some examples, a constraint is added such that the value range of tile_id in the geometry slice header be in the range of 0 to N, inclusive, where a value of N is one less than the number of tiles signaled in the tile_inventory( ) syntax associated with the frame.

In some examples, a constraint is added such that when the tile_inventory( ) syntax is not signaled/associated for a frame, the value of gsh_tile_id is equal to 0 for all the slices of the frame. For example, G-PCC decoder 300 may set the value of gsh_tile_id to be equal to 0 for all the slices of the frame (e.g., when tile_inventory( ) syntax is not signaled/associated for a frame).

Alternatively, when tile_inventory( ) is not signaled/associated for a frame, the gsh_tile_id may be specified to be ignored, or the bitstreams may be specified to be non-conforming/ignored by the decoders, e.g. G-PCC decoder 300.

In one example, the tile_id is not included in the slice header syntax.

In one example, the tile_inventory( ) associated with a frame may include one or more slice IDs that are associated with each tile. For example, for each tile specified in the tile inventory, a list of slice IDs may be signaled that specifies the slices associated with the tile.

In an example, the following changes are made to the tile inventory semantics. In some examples, the constraint may be added in other part of the codec as well. The beginning of changes from the draft G-PCC standard are marked <CHANGE> and the end of changes are marked </CHANGE>.

num_tiles_minus1 plus 1 specifies the number of tile bounding boxes present in the tile inventory.

tile_bounding_box_offset_x[i], tile_bounding_box_offset_y[i], and tile_bounding_box_offset_z[i] indicate the x, y, and z offsets of the i-th tile in cartesian coordinates.

tile_bounding_box_size_width[i], tile_bounding_box_size_height[i], and tile_bounding_box_size_depth[i] indicate the width, height, and depth of the i-th tile in the Cartesian coordinates.

<CHANGE> It is a requirement of bitstream conformance that a tile_inventory( ) syntax is present for each frame in the point cloud. </CHANGE>

Alternately, the following constraint may be added: It is a requirement of bitstream conformance that a tile_inventory( ) syntax is associated with each frame in the point cloud; the associated frame also has an associated frame index frame_idx.

The following changes may be made to the geometry slice header semantics. The beginning of changes from the draft G-PCC standard are marked <CHANGE> and the end of changes are marked </CHANGE>.

gsh_tile_id specifies the value of the tile id that is referred to by the GSH. The value of gsh_tile_id shall be in the range of 0 to <CHANGE> num_tiles_minus1 </CHANGE>, inclusive.

Multiple geometry slices within a tile are now described. Each tile may be coded in one or more slices. The slice bounding box is specified using the slice origin and the slice box dimensions. However, the signaling, e.g., by G-PCC encoder 200, of slice origin is conditioned on the value of the syntax element gps_box_present_flag. When gps_box_present_flag is equal to 0, the slice origin is inferred, by G-PCC decoder 300, to be equal to (0, 0, 0). When more than one geometry slice is present in a tile, setting gps_box_present_flag equal to 0 would result in multiple slices having the same origin which may not be desirable.

According to the techniques of this disclosure, in some examples, a constraint may be added such that when multiple slices are present in a tile associated with a frame, G-PCC encoder 200 may signal one or more syntax elements associated with slice origin and G-PCC decoder 300 may parse the one or more syntax elements. This constraint may be an explicit signaling constraint or indirect bitstream conformance constraint.

In another example, G-PCC encoder 200 may signal slice origin with respect to a normative bounding box that may be specified for the point cloud and G-PCC decoder 300 may parse the slice origin. The normative bounding box may be a box that is specified to contain all the reconstructed points in the point cloud. In some examples, the normative bounding box is the smallest such box that contains all the reconstructed points of the point cloud frame. In some examples, the normative bounding box is specified in the bitstream (e.g., signaled) or derived from other syntax elements, for example by G-PCC decoder 300.

For example, the normative bounding box may be specified by one or more of a bounding box origin and bounding box dimensions (width, height, depth).

In an example, the following constraint may be added to the semantics: When any two geometry slices with different values of gsh_slice_id are present for a particular tile of a point cloud frame, it is a requirement of bitstream conformance that the value of gps_box_present_flag shall be equal to 1.

Alternatively, the following constraint may be added to the semantics: When two geometry slices with different values of gsh_slice_id are present such that the tile ID and the frame index are the same for the two slices, it is a requirement of bitstream conformance that the value of gps_box_present_flag shall be equal to 1 for the GPS that is referred to by the two slices.

Alternatively, gps_box_present_flag is constrained to be 1 when two different geometry slices are present in a frame.

For example, the following constraint may be added to the semantics: When any two geometry slices with different values of gsh_slice_id are present for a point cloud frame, it is a requirement of bitstream conformance that the value of gps_box_present_flag shall be equal to 1.

Trisoup node size range is now described. When trisoup coding is used to code the positions in the point cloud, G-PCC encoder 200 uses the syntax element log 2_trisoup_node_size to specify the size of the nodes that are coded with trisoup coding mode to G-PCC decoder 300. G-PCC encoder 200 may signal this syntax element in the GPS and G-PCC decoder 300 may parse this syntax element. The semantics are as follows:

log 2_trisoup_node_size specifies the variable TrisoupNodeSize as the size of the triangle nodes as follows.

TrisoupNodeSize=1<<log 2_trisoup_node_size

When log 2 trisoup_node_size is equal to 0, the geometry bitstream includes only the octree coding syntax. When log 2_trisoup_node_size is greater than 0, it is a requirement of bitstream conformance that:

inferred_direct_coding_mode_enabled_flag must be equal to 0, and unique_geometry_points_flag must be equal to 1.

This syntax element may also be used to determine the maximum octree coding depth, because when trisoup coding is used, the slice is decoded using QTBT or octree up to a particular node size and subsequently using trisoup coding. This is described in the semantics as follows:

gsh_log 2_max_nodesize_x specifies the bounding box size in the x dimension, i.e., MaxNodesizeXLog 2 that is used in the decoding process as follows.

```
MaxNodeSizeXLog2 = gsh_log2_max_nodesize_x
MaxNodeSizeX = 1 << MaxNodeSizeXLog2
``` gsh_log 2_max_nodesize_y_minus_x specifies the bounding box size in the y dimension, i.e., MaxNodesizeYLog 2 that is used in the decoding process as follows:

```
MaxNodeSizeYLog2 = gsh_log2_max_nodesize_y minus_x +
   MaxNodeSizeXLog2.
       MaxNodeSizeY = 1 << MaxNodeSizeYLog2.
``` gsh_log 2_max_nodesize_z_minus_y specifies the bounding box size in the z dimension, i.e., MaxNodesizeZLog 2 that is used in the decoding process as follows.

```
MaxNodeSizeZLog2 = gsh_log2_max_nodesize_z_minus_y +
   MaxNodeSizeYLog2
       MaxNodeSizeZ = 1 << MaxNodeSizeZLog2
```

If gps_implicit_geom_partition_flag equals to 1, gsh_log 2_max_nodesize is derived as follows.

```
gsh_log2_max_nodesize = max{MaxNodeSizeXLog2,
   MaxNodeSizeYLog2, MaxNodeSizeZLog2}
``` gsh_log 2_max_nodesize specifies the size of the root geometry octree node when gps_implicit_geom_partition_flag is equal to 0. The variables MaxNodeSize, and MaxGeometryOctreeDepth are derived as follows.

```
MaxNodeSize = 1 << gsh_log_max_nodesize
MaxGeometryOctreeDepth = gsh_log2_max_nodesize -
   log2_trisoup_node_size
```

The variables K and M are then updated as follows.

```
gsh log2 min nodesize = min{MaxNodeSizeXLog2,
   MaxNodeSizeYLog2, MaxNodeSizeZLog2}
       if (K > (gsh_log2_max_nodesize - gsh_log2_min_nodesize))
           K = gsh_log2_max_nodesize - gsh_log2_min_nodesize;
       if (M > gsh_log2_min_nodesize)
           M = gsh_log2_min_nodesize;
       if (gsh_log2_max_nodesize = = gsh_log2_min_nodesize)
           M = 0;
       if (log2_trisoup_node_size != 0) {
           K = gsh_log2_max_nodesize - gsh_log2_min_nodesize;
           M = 0;
       }
```

In the draft G-PCC standard, there is no restriction on the range of log 2_trisoup_node_size. When the value of log 2_trisoup_node_size exceeds the slice dimensions, G-PCC decoder 300 may derive negative values of MaxGeometryOctreeDepth, which may be undesirable. Signaling a value of log 2_trisoup_node_size that is larger than the slice dimension is also inefficient.

According to the techniques of this disclosure, in some examples, a constraint may be added such that the value of log 2_trisoup_node_size is restricted to not exceed slice dimensions. In an example, the following constraint is added in the geometry slice header semantics: It is a requirement of bitstream conformance that the value of gsh_log 2_max_nodesize shall be greater than or equal to value of log 2_trisoup_node_size. Alternatively, the following constraint may be added in the geometry slice header semantics: It is a requirement of bitstream conformance that the value of log 2_trisoup_node_size shall be less than or equal to min (gsh_log 2_max_nodesize_x, gsh_log 2_max_nodesize_y, gsh_log 2_max_nodesize_z) when gps_implicit_geom_partition_flag is equal to 1, and shall be greater than or equal to gsh_log 2_max_nodesize otherwise.

The uniqueness of geometry slice ID is now described. A point cloud frame may be associated with more than one slice, and each slice may be associated with a geometry slice (that contains a geometry slice header). A geometry slice has an identifier, gsh_slice_id. When G-PCC encoder 200 signals attribute slices, the slices contain the ID of the geometry slice associated with the attribute slice. This syntax element ash_attr_geom_slice_id is signaled in the attribute slice header.

Currently, there is no restriction on the slice ID that may be assigned to a geometry slice. If more than one geometry slice has the same value of gsh_slice_id, then there may be an ambiguity when an attribute slice refers to a geometry slice with that particular value of slice ID. This behavior may be undesirable and may cause issues (e.g., decoding errors) when G-PCC decoder 300 attempts to decode the point cloud data.

According to the techniques of this disclosure, in some examples, a constraint may be added such that when two geometry slices associated with a frame have the same slice ID, the content of the geometry slices shall be the same. This constraint allows the repetition of slices within a frame. Alternatively, a constraint may be added such that no two geometry slices associated with a frame have the same value of slice ID. In an example, the following constraint may be added in the geometry slice header semantics: It is a requirement of bitstream conformance that for any two geometry slices that are associated with a frame and that have the same value of gsh_slice_id, the content of the two geometry slices shall be the same. This constraint may also be written as follows: When any geometry slices of a frame have the same value of gsh_slice_id, the content of the two geometry slices shall be the same.

For example, G-PCC decoder 300 may determine a first slice identifier (ID) of a first geometry slice associated with a frame of the point cloud data. G-PCC decoder 300 may determine a second slice ID of a second geometry slice associated with the frame of the point cloud data. Based on the second slice ID being equal to the first slice ID, G-PCC decoder 300 may determine the second slice to contain identical content to the first slice. G-PCC decoder 300 may decode the point cloud data based on the first slice ID.

In another example, the following constraint may be added: It is a requirement of bitstream conformance that no two geometry slices that are associated with a frame shall have the same value of gsh_slice_id. In some examples, the slice ID may be defined as a combination, or a function, of both the gsh_slice_id and tile_id. For example, one of the above constraints may be modified as follows: It is a requirement of bitstream conformance that when any two geometry slices are associated with a frame, and have the same value of gsh_slice_id, and have the same value of gsh_tile_id, the content of the two geometry slices shall be the same.

Unique positions for points are now described. In G-PCC, a voxel (associated with a unique position) in a point cloud may be associated with one or more points. In some applications, it may be desirable to restrict voxels to contain only one point or indicate whether voxels contain only one point. When a source point cloud may have more than one point associated with a voxel (or a position), the points in the voxels may be combined (by averaging or other means, and attributes recoloured or recomputed for the single point) to generate one point for the voxel. The G-PCC bitstream then may indicate that the voxel has only one point. There are two syntax elements in G-PCC that are associated with this indication.

1) Syntax element unique_point_positions_constraint_flag in the SPS specifies whether each position in the point cloud has a non-unique point (i.e., two or more points). The semantics of this syntax element is as follows:
unique_point_positions_constraint_flag equal to 1 indicates that in each point cloud frame that refers to the current SPS, all output points have unique positions. unique_point_positions_constraint_flag equal to 0 indicates that in any point cloud frame that refers to the current SPS, two or more output points may have the same position.

2) Syntax element unique_geometry_points_flag in the GPS specifies whether any voxel in a slice has a non-unique point. The semantics of this syntax element is as follows:
unique_geometry_points_flag equal to 1 indicates that in all slices that refer to the current GPS, all output points have unique positions within a slice. unique_geometry_points_flag equal to 0 indicates that in all slices that refer to the current GPS, two or more of the output points may have same positions within a slice When unique_point_positions_constraint_flag is equal to 1, all the points in the point cloud are associated with a unique point. However, G-PCC encoder 200 is allowed to signal in the bitstream unique_geometry_points_flag equal to 0 (which indicates two or more output points may be associated with the same position) even in such cases—which contradicts the signaling of unique_point_positions_constraint_flag. This could result in bitstream non-conformance or non-conformant behavior by the decoder, e.g., G-PCC decoder 300.

According to the techniques of this disclosure, in some examples, a constraint may be added such that when all points in the point cloud are indicated to be associated with a unique point, e.g., slices do not contain two points associated with the same position. In such cases, signaling or otherwise providing an indication that specifies that slices may contain two points associated with the same position may also be prohibited. In some examples, when it is specified that the position of the points in the point cloud are unique, one or more quantization/scaling methods may be disabled and G-PCC encoder 200 may not signal associated syntax elements.

In an example, the following constraint may be added to the semantics of the GPS: It is a requirement of bitstream conformance that when unique_points_positions_constraint_flag is equal to 1, the value of unique_geometry_points_flag shall not be equal to 0. In one example, the constraint may be phrased as follows: It is a requirement of bitstream conformance that when unique_geometry_points_flag (in the associated GPS) is equal to 0 for any slice, the value of unique_points_positions_constraint_flag (in the associated SPS) shall not be equal to 1.

Conditions on attribute specific parameter signaling in an SPS are now described.

Firstly, G-PCC encoder 200 may signal four different syntax parameters: attribute_cicp_colour_primaries[i], attribute_cicp_transfer_characteristics[i], attribute_cicp_matrix_coeffs[i], and attribute_cicp_video_full_range[i], for each attribute, although they are only applicable to color attribute.

Secondly, as per the semantics of known_attribute_label_flag, known_attribute_label and attribute_label_four_byte, G-PCC encoder 200 may signal some attributes, in multiple ways. For example, a color attribute can be indicated by using either:

a. Known_attribute_label_flag[i]=1, known_attribute_label[i]=0 (ue(v)), or b. Known_attribute_label_flag[i]=0, attribute_label_four_bytes[i]=0 (u(32))

Similarly, multiple ways of signaling apply to reflectance and frameIndex attributes as well. These multiple ways of signaling may lead to redundant signaling, which is inefficient.

According to the techniques of this disclosure, in some examples, G-PCC encoder 200 signals four different color related syntax elements (Cluster Iterative Closest Point (CICP) parameters) only for color attributes. G-PCC decoder 300 may parse these syntax elements. Color attributes, may include one or more of the following: RGB, YCbCr, YCoCg, ICtCp, or any other color space representation. The signaling of these syntax elements may be conditioned on one or more values of the attribute label/type (e.g., RGB, YCbCr, etc.).

In another example, G-PCC encoder 200 signals a syntax element to specify whether one or more of the CICP parameters are signaled for an attribute. G-PCC decoder 300 may parse this syntax element. When CICP parameters are not signaled, they may be inferred to be a default value that is pre-determined. For example, when CICP parameters are not signaled, G-PCC decoder 300 may infer the CICP parameters to be a default value.

To remove the redundancy, either of two alternative approaches may be used:

1. When known_attribute_label_flag is zero, the attribute_label_four_bytes should not contain the known attributes, such as color, reflectance and frame index.

2 Remove known_attribute_label_flag and known_attribute_label syntax elements, so that each attribute is only represented using attribute_label_four_bytes.

The beginning of changes from the draft G-PCC standard are marked <CHANGE> and the end of changes are marked </CHANGE>.

```
sps_num_attribute_sets                                    ue(v)
for( i = 0; i< sps_num_attribute_sets; i++ ) {
    attribute_dimension_minus1[ i ]                       ue(v)
    attribute_instance_id[ i ]                            ue(v)
attribute_bitdepth_minus1[i]                              ue(v)
    if(attribute_dimension_minus1[ i ] > 0 )
        attribute_secondary_bitdepth_minus1[ i ]          ue(v)
    <CHANGE> attribute_cicp_colour_primaries[ i ]         ue(v)
    attribute_cicp_transfer_characteristics[ i ]          ue(v)
    attribute_cicp_matrix_coeffs[ i ]                     ue(v)
    attribute_cicp_video_full_range_flag[ i ]             u(1)
    known_attribute_label_flag[ i ]                       u(1)
    if( known_attribute_label_flag[ i ] )
        known_attribute_label[ i ]                        ue(v)
    else
        attribute_label_four_bytes[ i ] </CHANGE>         u(32)
}
```

In an example (Example 1), the following changes to the G-PCC draft standard may be made. The beginning of changes from the draft G-PCC standard are marked <CHANGE> and the end of changes are marked </CHANGE>.

known_attribute_label_flag[i] equal to 1 specifies know_attribute_label is signaled for the i-th attribute. known_attribute_label_flag[i] equal to 0 specifies attribute_label_four_bytes is signaled for the i-th attribute.

known_attribute_label[i] equal to 0 specifies the attribute is colour. known_attribute_label[i] equal to 1 specifies the attribute is reflectance. known_attribute_label[i] equal to 2 specifies the attribute is frame index.

attribute_label_four_bytes[i] indicates the <CHANGE> remaining unknown attribute type with the 4 bytes code.</CHANGE> Table 7.1 describes the list of supported attributes and their relationship with attribute_label_four_bytes[i].

TABLE 7.1

| attribute_label_four_bytes | |
|---|---|
| attribute_label_four_bytes[ i ] | Attribute type |
| <CHANGE>0 | Transparency |
| 1 | Normals |
| 2 . . . 255 | Reserved |
| 256 . . . 0xffffffff | Unspecified </CHANGE> |

```
sps_num_attribute_sets                                    ue(v)
for( i = 0; i< sps_num_attribute_sets; i++ ) {
    attribute_dimension_minus1[ i ]                       ue(v)
    attribute_instance_id[ i ]                            ue(v)
    attribute_bitdepth_minus1[i]                          ue(v)
    if(attribute_dimension_minus1[ i ] > 0)
        attribute_secondary_bitdepth_minus1[ i ]          ue(v)
    known_attribute_label_flag[ i ]                       u(1)
    if( known_attribute_label_flag[ i ] )
        known_attribute_label[ i ]                        ue(v)
    else
        attribute_label_four_bytes[ i ]                   u(32)
<CHANGE> if(known_attribute_label[i]==0) /*color*/{
    attribute_cicp_colour_primaries[ i ]                  ue(v)
    attribute_cicp_transfer_characteristics[ i ]          ue(v)
    attribute_cicp_matrix_coeffs[ i ]                     ue(v)
    attribute_cicp_video_full_range_flag[ i ]             u(1)
} </CHANGE>
}
```

In another example, the following changes to the G-PCC draft standard may be made. The beginning of changes from the draft G-PCC standard are marked <CHANGE> and the end of changes are marked </CHANGE>.

```
sps_num_attribute_sets                                    ue(v)
for( i = 0; i< sps_num_attribute_sets; i++ ){
    attribute_dimension_minus1 [ i ]                      ue(v)
    attribute_instance_id[ i ]                            ue(v)
    attribute_bitdepth_minus1[i]                          ue(v)
    if(attribute_dimension_minus1[ i ] > 0 )
        attribute_secondary_bitdepth_minus1[ i ]          ue(v)
    <CHANGE> attribute_label_four_bytes[ i ]              u(32)
        if(attribute_label_four_bytes [i]==0) /*color*/{
            attribute_cicp_colour_primaries[ i ]          ue(v)
            attribute_cicp_transfer_characteristics[ i ]  ue(v)
            attribute_cicp_matrix_coeffs[ i ]             ue(v)
            attribute_cicp_video_full_range_flag[ i ]     u(1)
        }
    } </CHANGE>
}
```

In another example, the semantics of attribute_label_four_bytes may be specified as follows, with the beginning of deletions marked by <DELETE> and the end of deletions marked </DELETE> and the beginning of other changes marked <CHANGE> and the end of additions marked </CHANGE>:

attribute_label_four_bytes[i] indicates the <DELETE> known </DELETE> attribute type with the 4 bytes code <CHANGE> when known_attribute_label_flag is equal to 0 </CHANGE>. The table below describes the list of supported attributes and their relationship with attribute_label_four_bytes[i].

| attribute_label_four_bytes[ i ] | Attribute type |
|---|---|
| <DELETE>0 | <DELETE>Colour |
| 1 | Reflectance |
| 2 | Frame index</DELETE> |
| 3</DELETE><CHANGE>0 | Material ID |
| 1 | Transparency |
| 2 | Normals |
| 3</CHANGE> . . . 255 | Reserved |
| 256 . . . 0xffffffff | unspecified |

A unique attribute label may be specified as follows:
   AttributeLabel=attribute_label_four_bytes+N
where N is the number of known attributes labels specified (3 in the above example).

In another example (Example 2), The signaling of CICP parameters may be controlled by a flag attribute_cicp_paramspresent_flag[ ]. When the value of flag is equal to 0, G-PCC encoder 200 may not signal the CICP.

|  | Descriptor |
| --- | --- |
| seq_parameter set( ) { | |
|   main_profile_compatibility_flag | u(1) |
|   ... | |
|   sps_num_attribute_sets | ue(v) |
|   for( i = 0; i< sps_num_attribute_sets; i++ ) { | |
|     attribute_instance_id[ i ] | ue(v) |
|     attribute_dimension_minus1[ i ] | ue(v) |
|     attribute_bitdepth_minus1[ i ] | ue(v) |
|     if(attribute_dimension_minus1[ i ] > 0 ) | |
|       attribute_secondary_bitdepth_minus1[ i ] | ue(v) |
|     <CHANGE>attribute_cicp_params_present_flag[ i ] | <CHANGE>u(1)</CHANGE> |
|     if( attribute_cicp_params_present_flag[ i ] = = 1 ) {</CHANGE> | |
|       attribute_cicp_colour_primaries[ i ] | ue(v) |
|       attribute_cicp_transfer_characteristics[ i ] | ue(v) |
|       attribute_cicp_matrix_coeffs[ i ] | ue(v) |
|       attribute_cicp_video_full_range_flag[ i ] | u(1) |
|     <CHANGE>}</CHANGE> | |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
| ... | |

<CHANGE> attribute_cicp_params_present_flag[i] equal to 1 specifies that the syntax elements attribute_cicp_colour_primaries[i], attribute_cicp_transfer_characteristics[i], attribute_cicp_matrix_coeffs[i] and attribute_cicp_video_full_range_flag[i] are signalled for the i-th attribute set. attribute_cicp_params_present_flag[i] equal to 0 specifies that the syntax elements attribute_cicp_colour_primaries[i], attribute_cicp_transfer_characteristics[i], attribute_cicp_matrix_coeffs[i] and attribute_cicp_video_full_range_flag[i] are not signalled for the i-th attribute set. </CHANGE>

If it is decided that the CICP parameters are only needed for the color attributes, then the flag need not be signaled and rather the known_attribute_label[ ] or the attribute_label_four_bytes[ ] may be used to condition the presence of CICP parameters. For such a method, the signaling of the attribute labels may be made before the CICP parameters.

Generic representation of attribute-related parameters in an attribute parameter set (APS) and attribute slice header (ASH) is now described. Both APS and ASH are applicable to all attributes. In fact, each attribute may have their own APS and ASH, as described previously. However, both APS and ASH contain syntax elements named _*_luma*, and *_chroma_* mainly for quantization/scaling related parameters, which are semantically not consistent, as shown below.

Additionally, in an APS, some parameters are not applicable to a one-dimensional attribute (such as reflectance). These parameters may still be present and may still need to be signaled (e.g., by G-PCC encoder 200). Signaling values that effectively disable these parameters is one solution. However, this may burden the bitstream conformance check as decoders (such as G-PCC decoder 300) may have to handle all possible values to ensure robust decoding.

The APS and ASH syntax elements are shown below:

|  | Descriptor |
| --- | --- |
| attribute_parameter set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type = = 0 \|\| attr_coding_type = = 2 ) ? 1 : 0 | |
|   if( LodParametersPresent) { | |
|     lifting_num_pred_nearest_neighbours_minus1 | ue(v) |
|     lifting_search_range_minus1 | ue(v) |
|     for( k = 0; k < 3; k++ ) | |
|       lifting_neighbour_bias[ k] | ue(v) |
|     if ( attr_coding_type = = 2 ) | |
|       lifting_scalability_enabled_flag | u(1) |
|     if ( ! lifting_scalability_enabled_flag ) { | |
|       lifting_num_detail_levels_minus1 | ue(v) |
| [Ed. The V7.0 code use the variable without minus1. It should be aligned] | |
|       if ( lifting_num_detail_levels_minus1 > 0 ) { | |
|         lifting_lod_regular_sampling_enabled_flag | u(1) |
|         for( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
| lifting_sampling_distance_squared_scale_minus1[ idx] | ue(v) |
|             if ( idx != 0 ) | |
|               lifting_sampling_distance_squared_offset[ idx] | ue(v) |
|         } | |
|       } | |
|     } | |
|   if( attr_coding_type = = 0 ) { | |
|     lifting_adaptive_prediction_threshold | ue(v) |
|     lifting_intra_lod_prediction_num_layers | ue(v) |

| | Descriptor |
|---|---|
|     lifting_max_num_direct_predictors | ue(v) |
|     inter_component_prediction_enabled_flag | u(1) |
|   } | |
| } | |
| if( attribute_coding_type = = 1 ) { //RAHT | |
|   raht_prediction_enabled_flag | u(1) |
|   if (raht_prediction_enabled_flag) { | |
|     raht_prediction_threshold0 | ue(v) |
|     raht_prediction_threshold1 | ue(v) |
|   } | |
| } | |
| aps_extension _flag | u(1) |
| if( aps_extension _flag ) | |
|   while( more_data_in_byte_stream( ) ) | |
|     aps_extension_data_flag | u(1) |
| byte_alignment( ) | |
| } | |

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
| ash_attr_qp_delta_luma | se(v) |
|     if( attribute_dimension_minus1[ ash_attr_sps_attr_idx ] > 0 ) | |
| ash_attr_qp_delta_chroma | se(v) |
|   } | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|     ash_attr_layer_qp_delta_luma[i] | se(v) |
|       if( attribute_dimension_minus1[ ash_attr_sps_attr_idx ] > 0 ) | |
|     ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

According to the techniques of this disclosure, in some examples, for semantic consistence, *_luma_* and *_chroma_* may be respectively replaced with *_* (NULL) and *_secondary_*. Note, this only changes the naming of the syntax element, whereas there is no change to the functional meaning. Additionally, G-PCC encoder 200 may signal in the APS whether an attribute dimension is greater than 1, which may remove the presence of unnecessary syntax elements. (Note, in ASH, such a mechanism is already applied as the attribute dimension can be read from the SPS. However, for the APS, the same information cannot be read from the SPS, as that would lead to a dependency between parameter sets, which may be undesirable). G-PCC encoder 200 may signal whether the APS attribute dimension is greater than 1 as a flag.

In some examples, a condition may be added that the value of the flag shall not contradict the value of number of attribute dimensions signaled for the attribute (e.g., if the flag equals 1, the flag indicates that there is more than one dimension for an attribute; then the flag shall not be equal to 1 when the number of attributes is less than or equal to 1.)

In one example, a flag aps_attr_dimension_gt1 should be equal to 1 when attribute dimension is greater than 1. In one example, the signaling of a syntax element indicative of a secondary delta QP (e.g., ash_attr_qp_delta_secondary) may be conditioned on the number of attribute dimensions being greater than 1. For example, G-PCC decoder 300 may determine whether an attribute dimension of an attribute is greater than 1. Based on the attribute dimension being greater than 1, G-PCC decoder 300 may parse an attribute slice header syntax element indicative of a delta quantization parameter. G-PCC decoder 300 may decode the point cloud data based on the delta quantization parameter.

The following changes to the G-PCC draft standard may be made. The beginning of changes from the draft G-PCC standard are marked <CHANGE> and the end of changes are marked </CHANGE>.

| | Descriptor |
|---|---|
| attribute_parameter_set( ) { | |
|   aps_attr_parameter_set_id | ue(v) |
|   aps_seq_parameter_set_id | ue(v) |
|   attr_coding_type | ue(v) |
|   <CHANGE> aps_attr_dimension_gt1 | u(1) </CHANGE> |
|   aps_attr_initial_qp | ue(v) |
|   <CHANGE> if(aps_attr_dimension_gt1) | |
|     aps_attr_secondary_qp_offset </CHANGE> | se(v) |
|   aps_slice_qp_delta_present_flag | u(1) |

| | Descriptor |
|---|---|
| LodParametersPresent = ( attr_coding_type = = 0 \|\| attr_coding_type = = 2 ) ? 1 : 0 | |
| if( LodParametersPresent) { | |
|     lifting_num_pred_nearest_neighbours_minus1 | ue(v) |
|     lifting_search_range_minusl | ue(v) |
|     for( k = 0; k < 3; k++ ) | |
|         lifting_neighbour_bias[ k ] | ue(v) |
|     if ( attr_coding_type = = 2 ) | |
|         lifting_scalability_enabled_flag | u(1) |
|     if ( ! lifting_scalability_enabled_flag ) { | |
|         lifting_num_detail_levels_minus1 | ue(v) |
| [Ed. The V7.0 code use the variable without minusl. It should be aligned] | |
|         if ( lifting_num_detail_levels_minus1 > 0 ) { | |
|             lifting_lod_regular_sampling_enabled_flag | u(1) |
|             for( idx = 0; idx < num_detail_levels_minus1; idx++ ) { | |
|                 if ( lifting_lod_regular_sampling_enabled_flag ) | |
|                     lifting_sampling_period_minus2[ idx ] | ue(v) |
|                 else | |
| lifting_sampling_distance_squared_scale_minus1[ idx] | ue(v) |
|                 if ( idx != 0 ) | |
| lifting_sampling_distance_squared_offset[ idx ] | ue(v) |
|             } | |
|         } | |
|     } | |
|     if( attr_coding_type = = 0 ) { | |
|         lifting_adaptive_prediction_threshold | ue(v) |
|         lifting_intra_lod_prediction_num_layers | ue(v) |
|         lifting_max_num_direct_predictors | ue(v) |
|         <CHANGE> if(aps_attr_dimension_gt1) | |
|             inter_component_prediction_enabled_flag | u(1) |
| </CHANGE> | |
|     } | |

| | Descriptor |
|---|---|
| attribute_slice_header( ) { | |
|     ash_attr_parameter_set_id | ue(v) |
|     ash_attr_sps_attr_idx | ue(v) |
|     ash_attr_geom_slice_id | ue(v) |
|     if ( aps_slice_qp_delta_present_flag ) { | |
| <CHANGE> ash_attr_qp_delta </CHANGE> | se(v) |
|         if( attribute_dimension_minus1[ ash_attr_sps_attr_idx ] > 0 ) | |
|         <CHANGE> ash_attr_qp_delta_secondary </CHANGE> | se(v) |
|     } | |
|     ash_attr_layer_qp_delta_present_flag | u(1) |
|     if ( ash_attr_layer_qp_delta_present_flag ) { | |
|         ash_attr_num_layer_qp_minus1 | ue(v) |
|         for( i = 0; i < NumLayerQp; i++ ){ | |
|             <CHANGE> ash_attr_layer_qp_delta[i] </CHANGE> | se(v) |
|             if( attribute_dimension_minus1[ ash_attr_sps_attr_idx ] > 0 ) | |
|             <CHANGE> ash_attr_layer_qp_delta_secondary[i] </CHANGE> | se(v) |
|         } | |
|     } | |
|     ash_attr_region_qp_delta_present_flag | u(1) |
|     if ( ash_attr_region_qp_delta_present_flag ) { | |
|         ash_attr_qp_region_box_origin_x | ue(v) |
|         ash_attr_qp_region_box_origin_y | ue(v) |
|         ash_attr_qp_region_box_origin_z | ue(v) |
|         ash_attr_qp_region_box_width | ue(v) |
|         ash_attr_qp_region_box_height | ue(v) |
|         ash_attr_qp_region_box_depth | ue(v) |
|         ash_attr_region_qp_delta | se(v) |
|     } | |
|     byte_alignment( ) | |
| } | | region_qp_delta_signaling is now described. In an ASH, there is a flag to indicate whether region_qp_delta is present or not, and another syntax element to indicate region_qp_delta value. However, if region_qp_delta_present_flag is true, the value of region_qp_delta should be nonzero.

Additionally, according to the draft G-PCC standard, each slice can only specify one region where delta QP can be used. However, it is perhaps more flexible to allow the possibility of having multiple such regions instead of only one. Bounding boxes of such regions may or may not be overlapping. In this case, a point may belong to multiple bounding boxes (in the overlapping case), and the delta qp of the lowest region index may be used, or alternatively the delta qp of the nearest neighbor point may be used.

According to the techniques of this disclosure, in an example, instead of G-PCC encoder 200 signaling region_qp_delta, G-PCC encoder 200 may signal region_qp_delta_abs_minus1 (magnitude) and region_qp_delta_sign. The following changes to the G-PCC draft standard may be made. The beginning of changes from the draft G-PCC standard are marked <CHANGE> and the end of changes are marked </CHANGE>.

| | Descriptor |
|---|---|
| ash_attr_region_qp_delta_present_flag | u(1) |
| if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |

| | |
|---|---|
| <CHANGE> ash_attr_region_qp_delta_abs_minus1 | ue(v) |
| ash_attr_region_qp_delta_sign | u(1) |
| | </CHANGE> |
| } | |
| byte alignment( ) | |
| } | |

In another example, ash_attr_numregions_qp_delta specifies the number of regions where deltaQP will be applied. The value of ash_attr_num_regions_qp_delta may be in the range of 0 to N, inclusive, where N may be a pre-determined value (e.g., 4 or 8). The following changes to the G-PCC draft standard may be made. The beginning of changes from the draft G-PCC standard are marked <CHANGE> and the end of changes are marked </CHANGE>.

| | |
|---|---|
| ash_attr_num_regions_qp_delta | ue(v) |
| for ( i=0;i<ash_attr_num_regions_qp_delta; i++ ) { | |
|    ash_attr_qp_region_box_origin_x[i] | ue(v) |
|    ash_attr_qp_region_box_origin_y[i] | ue(v) |
|    ash_attr_qp_region_box_origin_z[i] | ue(v) |
|    ash_attr_qp_region_box_width[i] | ue(v) |
|    ash_attr_qp_region_box_height[i] | ue(v) |
|    ash_attr_qp_region_box_depth[i] | ue(v) |
|    <CHANGE> ash_attr_region_qp_delta_abs_minus1[i] | ue(v) |
|    ash_attr_region_qp_delta_sign [i] | u(1) |
| | </CHANGE> |
| } | |
| byte alignment( ) | |
| } | |

LoD parameters when coding a point cloud with multiple attributes are now described. When spatial scalability is needed, lifting_scalibility_enabled_flag should be true for all the attributes. In the draft G-PCC standard, this flag is independently coded for each attribute, which does not necessarily follow this requirement every time. Also, as a corollary, both attributes should use the same transform, e.g., the lifting transform, e.g., attr_coding_type==2. Such a restriction is also not present in the draft G-PCC standard.

Additionally, in typical use cases, LoD generation parameters are shared across all attributes (as in G-PCC common test conditions), although G-PCC encoder 200 may signal the LoD generation parameters separately for each attribute. Signaling these parameters multiple times is inefficient as this increases the bit budget for typical use cases.

According to the techniques of this disclosure, in an example, to provide the means of sharing the LoD parameters if applicable, a common LoD parameter set (CPS) may be defined where G-PCC encoder 200 may define common LoD parameters. On the APS level, G-PCC encoder 200 may override common LoD parameters if the attributes need to use different LoD parameters. The following changes to the G-PCC draft standard may be made. The beginning of changes from the draft G-PCC standard are marked <CHANGE> and the end of changes are marked </CHANGE>.

| | Descriptor |
|---|---|
| attribute_parameter_set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type = = 0 \|\| attr_coding_type = = 2 ) ? 1 : 0 | |
|   <CHANGE>if ( attr_coding_type = = 2 ) | |
|     lifting_scalability_enabled_flag | u(1) |
|   if(LodParametersPresent && !lifting_scalability_enabled_flag) | |
|     aps_lod_parameters_override_flag | u(1) |
| </CHANGE> | |
|   if( aps_lod_parameters_override_flag) { | |
|     lifting_num_pred_nearest_neighbours_minus1 | ue(v) |
|     lifting_search_range_minus1 | ue(v) |
|     for( k = 0; k < 3; k++ ) | |
|       lifting_neighbour_bias[ k ] | ue(v) |
|     if ( ! lifting_scalability_enabled_flag ) { | |
|       lifting_num_detail_levels_minus1 | ue(v) |
| [Ed. The V7.0 code use the variable without minus1. It should be aligned] | |
|       if ( lifting_num_detail_levels_minus1 > 0 ) { | |
|         lifting_lod_regular_sampling_enabled_flag | u(1) |
|         for( idx = 0; idx < num detail levels minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |

| | Descriptor |
|---|---|
| <CHANGE>common_lod_parameter set( ) { | |
|   cps_attr_parameter_set_id | ue(v) |
|   cps_seq_parameter_set_id | ue(v) |
|   cps_attr_coding_type | ue(v) |
|   LodParametersPresent = (cps_ attr_coding_type = = 0 \|\| cps_attr_coding_type = = 2 ) ? 1 : 0 | |
|     if ( cps_attr_coding_type = = 2 ) | |
|       cps_lifting_scalability_enabled_flag | u(1) |
|   if( LodParametersPresent) { | |
|     cps_lifting_num_pred_nearest_neighbours_minus1 | ue(v) |
|     cps_lifting_search_range_minus1 | ue(v) |
|     for( k = 0; k < 3; k++ ) | |
|       cps_lifting_neighbour_bias[ k ] | ue(v) |
|     if ( ! lifting_scalability_enabled_flag ) { | |
|       cps_lifting_num_detail_levels_minus1 | ue(v) |
| [Ed. The V7.0 code use the variable without minus1. It should be aligned] | |
|       if (cps_lifting_num_detail_levels_minus1 > 0 ) { | |
|         cps_lifting_lod_regular_sampling_enabled_flag | u(1) |
|         for( idx = 0; idx < num_detail_levels_minus1; idx++ ) { | |
|           if (cps_ lifting_lod_regular_sampling_enabled_flag ) | |
|             cps_lifting_sampling_period_minus2[ idx ] | ue(v) |
|           else | |
| cps_lifting_sampling_distance_squared_scale_minus1[ idx ] | ue(v) |
|             if ( idx != 0 ) | |
| cps_lifting_sampling_distance_squared_offset[ idx ] | ue(v) |
|         } | |
|       } | |
|     } | |
| } </CHANGE> | |

When the override flag is not present in an APS, G-PCC decoder 300 may determine the corresponding parameters are equal to a corresponding CPS parameter. Also, the attribute coding type and lifting scalability enabled flag should be the same for the APS of different attributes and the CPS.

The semantics of the syntax elements in the CPS listed above are similar to those currently defined in the APS, and apply to all the attributes that refer to the CPS.

In one example, G-PCC encoder 200 may signal a CPS ID in the APS or the ASH to specify the CPS corresponding to a particular attribute. G-PCC decoder 300 may parse the CPS ID. In another example, G-PCC encoder 200 may signal the CPS ID in the APS only when the aps_lod_parameters_override_flag is equal to 0.

In some examples, the signaling of the aps_lod_parameters_override_flag may be controlled by a higher level indication (e.g. aps_lod_parameters_override_present_flag) that G-PCC encoder 200 may signal in the SPS. When the higher level indication specifies that aps_lod_parameters_override flag is not signaled, G-PCC encoder 200 may not explicitly signal APS LoD parameters in the APS. G-PCC decoder 300 may derive the APS LoD parameters from a CPS to be used for the attribute.

In another example, G-PCC encoder 200 may signal an LoD attribute parameter set that is expected to contain the LoD information for the attributes of the point cloud. G-PCC decoder 300 may parse the LoD information. When lifting scalability is used for any attribute that is coded with attr_coding_type=2 (prediction lifting), all attributes coded with attr_coding_type=2 (prediction lifting) may be coded with lifting scalability. The parameter set may be referred to by the attribute slice header. The changes to the APS and the new LoD parameter set in the draft G-PCC standard are specified below with changes shown between <CHANGE> and </CHANGE> and deletions shown between <DELETE> and </DELETE>:

| | Descriptor |
|---|---|
| attribute_parameter set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   if(attr_coding_type = = 0) { //RAHT | |
|     raht_prediction_enabled_flag | u(1) |
|     if (raht_prediction_enabled_flag) { | |
|       raht_prediction_threshold0 | ue(v) |
|       raht_prediction_threshold1 | ue(v) |
|     } | |
|   } | |

-continued

| | Descriptor |
|---|---|
| else if (attr_coding_type <= 2) <DELETE> {</DELETE> | |
|   <CHANGE>aps_lod_parameter_set_id<CHANGE> | <CHANGE>ue(v)</CHANGE> |
| <DELETE> | <DELETE>ue(v) |
|   lifting_num_pred_nearest_neighbours_minus1 | |
|   lifting_search_range_minus1 | ue(v) |
|   for( k = 0; k < 3; k++ ) | |
|     lifting_neighbour_bias[ k ] | ue(v) |
|   if ( attr_coding_type == 2 ) | |
|     lifting_scalability_enabled_flag | u(1) |
|   if ( ! lifting_scalability_enabled_flag ) { | |
|     lifting_num_detail_levels_minus1 | ue(v) |
|     if ( lifting_num_detail_levels_minus1 > 0 ) { | |
|       lifting_lod_regular_sampling_enabled_flag | u(1) |
|       for( idx = 0; idx < num_detail_levels_minus1; idx++ ) { | |
|         if ( lifting_lod_regular_sampling_enabled_flag ) | |
|           lifting_sampling_period_minus2[ idx ] | ue(v) |
|         else | |
| lifting_sampling_distance_squared_scale_minus1[ idx ] | ue(v) |
|         if ( idx != 0 ) | |
| lifting_sampling_distance_squared_offset[ idx ] | ue(v)</DELETE> |
|       } | |
|     } | |
|   } </DELETE> | |
|   if( attr_coding_type == 1 ) { | |
|     lifting_adaptive_prediction_threshold | ue(v) |
|     lifting_intra_lod_prediction_num_layers | ue(v) |
|     lifting_max_num_direct_predictors | ue(v) |
|     inter_component_prediction_enabled_flag | u(1) |
|   } | |
| } | |
| aps_extension_flag | u(1) |
| if( aps_extension_flag) | |
|   while( more_data_in_byte_stream( ) ) | |
|     aps_extension_data_flag | u(1) |
| byte_alignment( ) | |
| } | |

<CHANGE> apslod_parameter_set_id specifies the value of apslod_parameter_set_id for the active LoD parameter set. The value of aps_lod_parameter_set_id shall be in the range of 0 to 15, inclusive.

When attr_coding_type is equal to 1, the value of lifting_scalability_enabled_flag in the LoD parameter set referred to by aps_common_lod_parameter_set_id shall be equal to 0.

When two or more attributes refer to the respective APS that have attr_coding_type equal to 2, the value of lifting_scalability_enabled_flag shall be the same for LoD parameter sets referred to by aps_lod_parameter_set_id of the respective APS. </CHANGE>

Alternatively, the following constraint may be added to the draft G-PCC standard: The value of lifting_scalability_enabled_flag shall be the same for all of the attributes of a point cloud.

| | Descriptor |
|---|---|
| lod_parameter_set( ) { | |
|   lod_parameter_set_id | ue(v) |
|   lifting_num_pred_nearest_neighbours_minus1 | ue(v) |
|   lifting_search_range_minus1 | ue(v) |
|   for( k = 0, k < 3, k++ ) | |
|     lifting_neighbour_bias[ k ] | ue(v) |
|   lifting_scalability_enabled_flag | u(1) |
|   if ( ! lifting_scalability_enabled_flag ) { | |

-continued

| | Descriptor |
|---|---|
|     lifting_num_detad_levels_minus1 | ue(v) |
|     if ( lifting_num_detail_levels_minus1 > 0 ) { | |
|       lifting_lod_regular_sampling_enabled_flag | u(1) |
|       for( idx = 0; idx < lifting_num_detail_levels_minus1; idx++ ) { | |
|         if ( lifting_lod_regular_sampling_enabled_flag ) | |
|           lifting_sampling_period_minus2[ idx ] | ue(v) |
|         else | |
|       lifting_sampling_distance_squared_scale_minus1[ idx ] | ue(v) |
|         if ( idx != 0 ) | |
|           lifting_sampling_distance_squared_offset[ idx ] | ue(v) |
|       } | |
|     } | |
|   } | |
|   lps_extension_flag | u(1) |
|   if( lps_extension_flag ) | |
|     while( more_data_in_byte_stream( ) ) | |
|       lps_extension_data_flag | u(1) |
|   byte_alignment( ) | |
| } | |

The semantics of all the syntax elements in the LoD parameter set may be identical to that of the APS, except that they apply to the attributes that refer to the LoD parameter set. Other changes include the following:

<CHANGE> lod_parameter_set_id provides an identifier for the LPS for reference by other syntax elements. The value of lod-parameter_set_id shall be in the range of 0 to 15, inclusive.

lps_extension_flag equal to 0 specifies that no lps_extension_data_flag syntax elements are present in the LPS syntax structure. lps_extension_flag shall be equal to 0 in bitstreams conforming to this version of this Specification. The value of 1 for lps_extension_flag is reserved for future use by ISO/JEC. Decoders shall ignore all lps_extension_data_flag syntax elements that follow the value 1 for lps_extension_flag in an LPS syntax structure. lps_extension_data_flag may have any value. Its presence and value do not affect decoder conformance to profiles specified in this version of this Specification. Decoders conforming to this version of this Specification shall ignore all lps_extension_data_flag syntax elements. </CHANGE>

Geometry slices referring to parameter sets are now discussed. In the draft G-PCC standard, a geometry slice contains a gsh_geometry_parameter_set_id that is the ID of the GPS to which the slice refers. There is no restriction on the value range of gsh_geometry_parameter_set_ID. The value of gps_geom_parameter_set_id (a separate syntax element in the GPS, rather than the GSH) is in the range of 0 to 15, inclusive.

Moreover, each geometry slice in a point cloud frame/tile is allowed to refer to any GPS (because each geometry slice in a frame/tile may signal any valid value of gsh_geometry_parameter_set_id.) Although there may be some special use cases where such flexibility may be needed, for most typical cases it does not make sense to have such flexibility. Such flexibility also forces decoders (e.g., G-PCC decoder 300) to conduct conformance checks to test all possible combinations (different values for the GPS syntax elements in different GPSs that may be referred by the same frame). This increases costs for decoder manufacturers.

According to the techniques of this disclosure, in an example, a restriction may be added that the value of gsh_geometry_parameter_set_id shall be in the range of 0 to 15, inclusive. For example, G-PCC encoder 200 may encode the value of gsh_geometry_parameter_set_id within the range of 0 to 15 inclusive.

In some examples, when more than one geometry slice is present in a tile, a restriction may be added that each such slice shall refer to the same GPS. In one example, when more than one geometry slice is present in a frame, a restriction may be added that each such slice shall refer to the same GPS. In another example, when more than one geometry slice is present in the point cloud sequence/bitstream, a restriction may be added that each such slice shall refer to the same GPS. G-PCC encoder 200 may apply these restrictions.

In an example, the value range of gsh_geometry_parameter_set_id is specified, and geometry slices of the same frame are restricted to refer to the same GPS.

gsh_geometry_parameter_set_id specifies the value of the gps_geom_parameter_set_id of the active GPS. <CHANGE> The value of gsh_geometry_parameter_set_id shall be in the range of 0 to 15, inclusive.

When more than one geometry slice is associated with a frame, the value of gsh_geometry_parameter_set_id shall be the same for all the geometry slices associated with the frame. </CHANGE>

Alternatively, the following could be added to the draft G-PCC standard: When more than one geometry slice is associated with a tile, the value of gsh_geometry_parameter_set_id shall be the same for all the geometry slices associated with the tile.

Attribute slices referring to parameter sets are now discussed. In the draft G-PCC standard, the attribute slice contains an ash_attr_parameter_set_id that is the identifier of the APS to which the slice refers. There is no restriction on the value range of ash_attr_parameter_set_ID. The value of aps_attr_parameter_set_id (a separate syntax element in the APS, rather than the ASH) is in the range of 0 to 15, inclusive.

Moreover, according to the draft G-PCC standard, each attribute slice (of a particular attribute) in a point cloud frame/tile is allowed to refer to any APS (because each attribute slice in a frame/tile may signal any valid value of ash_attr_parameter_set_id). Although there may be some special use cases where such flexibility may be needed, for most typical cases it does not make sense to have such flexibility. Such flexibility also forces decoders (such as G-PCC decoder 300) to conduct conformance checks to test all possible combinations (different values for the APS syntax elements in different APSs that may be referred to by the same frame). This increases costs for decoder manufacturers.

According to the techniques of this disclosure, in an example, a restriction may be added that the value of ash_attr_parameter_set_id shall be in the range of 0 to 15, inclusive. For example, G-PCC encoder 200 may encode the value of ash_attr_parameter_set_id to be within the range of 0 to 15.

When more than one attribute slice of the same attribute (e.g., ash_attr_sps_attr_idx) is present in a tile, a restriction may be added that each such slice shall refer to the same GPS. In one example, when there is more than one attribute slice of the same attribute (e.g., ash_attr_sps_attr_idx) in a frame, a restriction may be added that each such slice shall refer to the same GPS. In another example, when there is more than one attribute slice of the same attribute (e.g., ash_attr_sps_attr_idx) in a point cloud sequence/bitstream, a restriction may be added that each such slice shall refer to the same GPS. G-PCC encoder 200 may apply these restrictions.

In one example, the value range of ash_attr_parameter_set_id is specified, and attribute slices (of the same attribute type or index) of the same frame are restricted to refer to the same APS.

ash_attr_parameter_set_id specifies the value of the aps_attr_parameter_set_id of the active APS. The value of ash_attr_parameter_set_id shall be in the range of 0 to 15, inclusive.

<CHANGE> When more than one attribute slice is associated with a frame, the value of ash_attr_parameter_set_id shall be the same for all the attribute slices associated with the frame that have the same value of ash_attr_sps_attr_idx. </CHANGE>

Alternatively, the following could be added to the draft G-PCC standard: When more than one attribute slice is associated with a tile, the value of ash_attr_parameter_set_id shall be the same for all the attribute slices associated with the tile that have the same value of ash_attr_sps_attr_idx.

Figure 7:
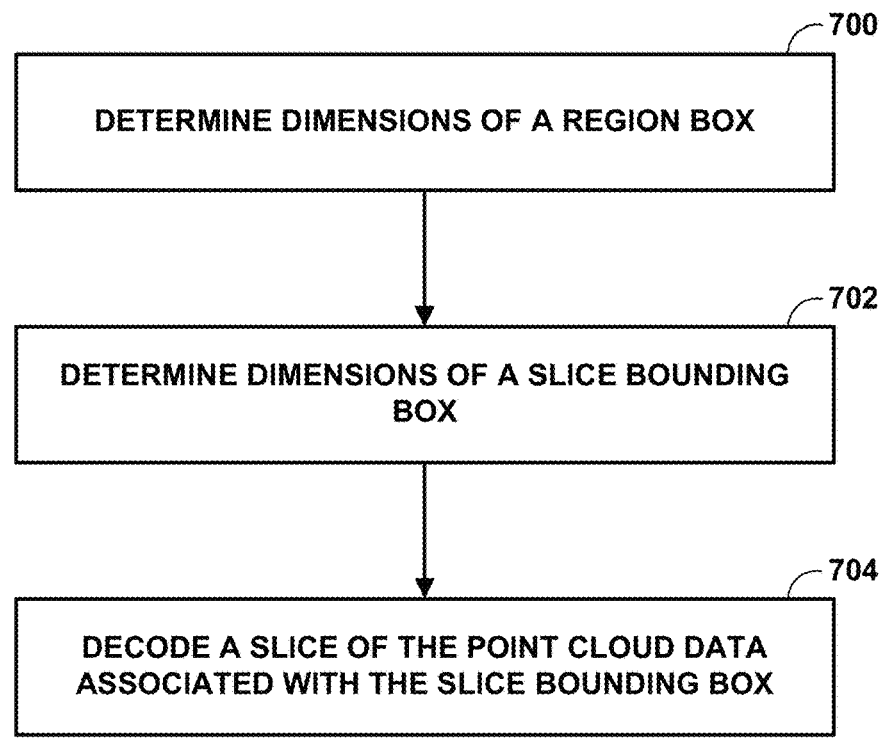
FIG. 7 is a flow diagram of example region box and slice bounding box techniques according to this disclosure.

FIG. 7 is a flow diagram of example region box and slice bounding box techniques according to this disclosure. G-PCC decoder 300 may determine dimensions of a region box (700). For example, G-PCC decoder 300 may parse a syntax element(s) indicative of dimensions of the region box. G-PCC decoder 300 may determine dimensions of a slice bounding box (702). For example, G-PCC decoder 300 may parse a syntax element(s) indicative of dimensions of the slice bounding box. G-PCC decoder 300 may decode a slice of the point cloud data associated with the slice bounding box (704). For example, G-PCC decoder 300 may decode the slice within the slice bounding box. The dimensions of the region bounding box may be constrained to not exceed the dimensions of the slice bounding box. For example, it may be a requirement of bitstream conformance that the dimensions of the region bounding box not exceed the dimensions of the slice bounding box. In some examples, the dimensions of the region box are constrained such that no point in the region box is outside the slice bounding box.

Figure 8:
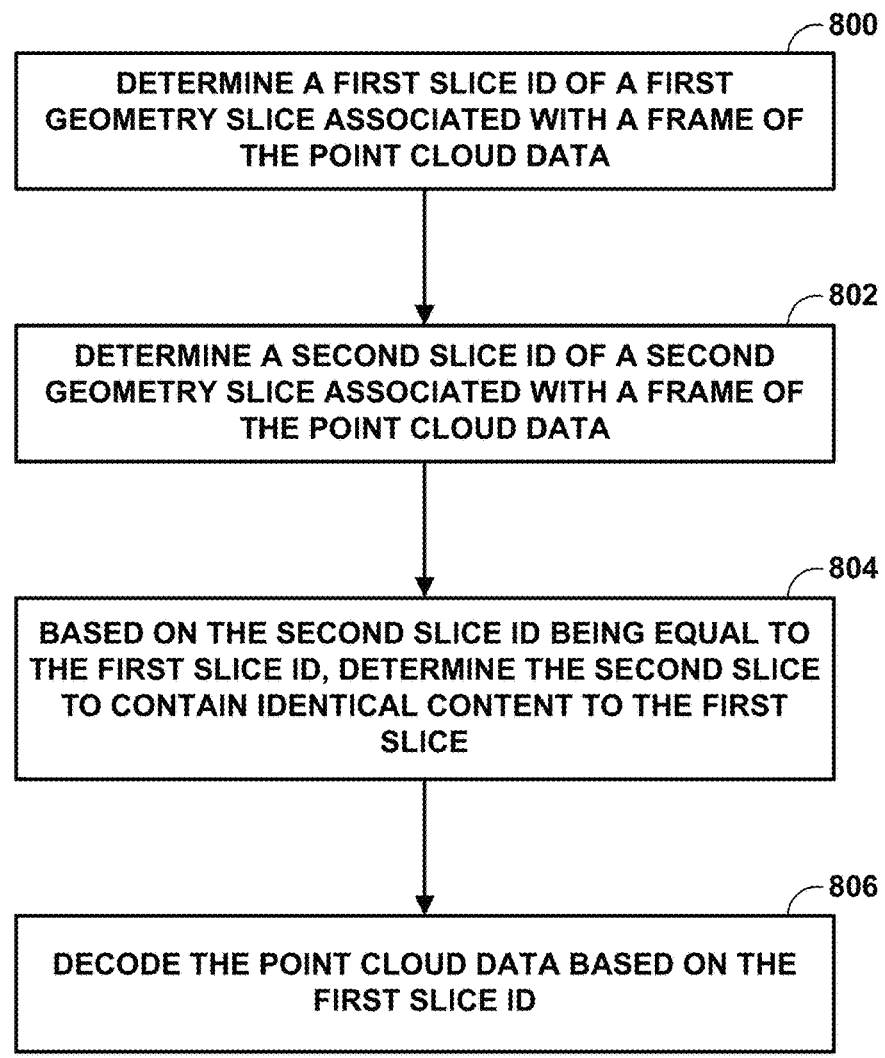
FIG. 8 is a flow diagram of an example slice identifier techniques according to this disclosure.

FIG. 8 is a flow diagram of an example slice identifier techniques according to this disclosure. G-PCC decoder 300 may determine a first slice ID of a first geometry slice associated with a frame of the point cloud data (800). For example, G-PCC decoder 300 may parse a syntax element indicative of the first slice ID of the first geometry slice of the frame. G-PCC decoder 300 may determine a second slice ID of a second geometry slice associated with the frame of the point cloud data (802). For example, G-PCC decoder 300 may parse a syntax element indicative of the second slice ID of the second geometry slice of the frame. Based on the second slice ID being equal to the first slice ID, G-PCC decoder 300 may determine the second slice to contain identical content to the first slice (804). For example, it may be a requirement of bitstream conformance that if a first geometry slice of a frame of point cloud data has the same slice ID as a second geometry slice of the frame, that the content of the first geometry slice and the second geometry slice be the same. G-PCC decoder 300 may decode the point cloud data based on the first slice ID (806). For example, G-PCC decoder 300 may decode both the first geometry slice and the second geometry slice based on the first slide ID.

Figure 9:
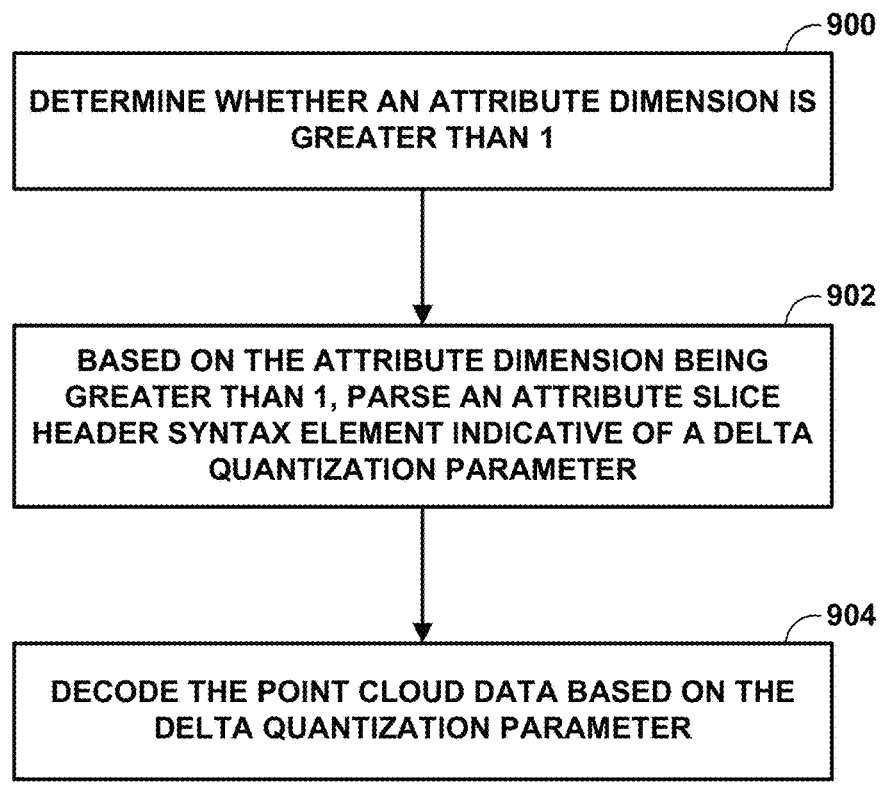
FIG. 9 is a flow diagram illustrating an example of delta quantization parameter techniques according to this disclosure.

FIG. 9 is a flow diagram illustrating an example of delta quantization parameter techniques according to this disclosure. G-PCC decoder 300 may determine whether an attribute dimension of an attribute is greater than 1 (900). For example, G-PCC decoder 300 may parse a syntax element indicative of whether the attribute dimension is greater than 1 in a sequence parameter set. Based on the attribute dimension being greater than 1, G-PCC decoder 300 may parse an attribute slice header syntax element indicative of a delta quantization parameter (902). For example, G-PCC decoder 300 may parse ash_attr_qp_delta_secondary (or ash_attr_qp_delta_chroma) in an attribute slice header. G-PCC decoder 300 may decode the point cloud data based on the delta quantization parameter (904). In some examples, as part of determining whether the attribute dimension is greater than 1, G-PCC decoder 300 may parse a syntax element in a sequence parameter set.

In some examples, G-PCC decoder 300 may determine a slice dimension, parse a trisoup node size syntax element indicative of a size of a node coded with trisoup coding mode, and decode the point cloud data based on the size of the node. In these examples, a value of the trisoup node size syntax element may be constrained to not exceed the slice dimension.

In some examples, G-PCC decoder 300 may parse an attribute slice header syntax element indicative of a number of regions where a delta quantization parameter will be applied, and decode the point cloud data based on the number of regions. In these examples, a value of the attribute slice header syntax element may be constrained within a range of 0 to N, where N is a predetermined value, such as 4 or 8 or some other value. The number of regions may be coded using exponential golomb code (e.g., ue(v)).

In some examples, G-PCC decoder 300 may parse a geometry slice header syntax element indicative of a geometry parameter set identifier. In these examples, a value of the geometry slice header syntax element is restricted to be in a range of 0 to 15 inclusive. In some examples, G-PCC decoder may decode the point cloud data further based on a geometry parameter set identified by the geometry parameter set identifier.

In some examples, G-PCC decoder 300 may parse an attribute slice header syntax element indicative of an attribute parameter set identifier. In these examples, a value of the attribute slice header syntax element may be restricted to be in a range of 0 to 15 inclusive. In some examples, G-PCC decoder may decode the point cloud data further based on an attribute parameter set identified by the attribute parameter set identifier.

Examples in the various aspects of this disclosure may be used individually or in any combination.

This disclosure contains the following examples.

Clause 1. A method of coding point cloud data, the method comprising: constraining a region box to not exceed dimensions of a slice bounding box; and coding a slice of the point cloud data associated with the slice bounding box.

Clause 2. The method of clause 1, wherein the constraining the region box comprises constraining the region box such that no point in the region box is outside the slice bounding box.

Clause 3. The method of clause 1 or 2, further comprising refraining from signaling a value of 0 for a width, height or depth of the region box.

Clause 4. A method of coding point cloud data, the method comprising: associating a tile_inventory( ) syntax element with a frame of the point cloud data; and coding the frame based on the tile_inventory( ) syntax element.

Clause 5. The method of clause 4, further comprising signaling the tile_inventory( ) syntax element.

Clause 6. The method of clause 4, wherein the associating the tile_inventory( ) syntax element with the frame comprises: determining whether a frame index associated with the frame has an equivalent value to the tile_inventory( ) syntax element; and based on the frame index having an equivalent value to the tile_inventory( ) syntax element, associating the tile_inventory( ) syntax element with the frame.

Clause 7. The method of any combination of clauses 4-6, further comprising constraining the value of tile_id in a geometry slice header to be in the range of 0 to N, inclusive, wherein the value of N is one less than a number of tiles signaled in the tile_inventory( ) syntax element associated with the frame.

Clause 8. A method of coding point cloud data, the method comprising: determining whether multiple slices are present in a tile associated with a frame; based on there being multiple slices present in the tile, determining one or more syntax elements; and coding the point cloud data based on the syntax elements.

Clause 9. The method of clause 8, further comprising: determining whether two geometry slices have different values of gsh_slice_id for a tile; and based on the two geometry slices having different values of gsh_slice_id, determining a value of gps_box_present_flag to be 1.

Clause 10. The method of clause 8, further comprising: determining whether two geometry slices have different values of gsh_slice_id and a same tile ID and a same frame index; and based on the two geometry slices having different values of gsh_slice_id and a same tile ID and a same frame index, determining a value of gps_box_present_flag to be 1.

Clause 11. A method of coding point cloud data, the method comprising: determining a slice dimension; restricting a value of log 2_trisoup_node_size to not exceed the slice dimension; and coding the point cloud data based on the log 2_trisoup_node_size.

Clause 12. The method of clause 11, wherein a value of gsh_log 2_max_nodesize is greater than or equal to the value of log 2_trisoup_node_size.

Clause 13. The method of clause 11, wherein the value of log 2_trisoup_node_size syntax element is less than or equal to min(gsh_log 2_max_nodesize_x, gsh_log 2_max_nodesize_y, gsh_log 2_max_nodesize_z) when gps_implicit_geom_partition_flag is equal to 1, and greater than or equal to gsh_log 2_max_nodesize otherwise.

Clause 14. A method of coding point cloud data, the method comprising: determining whether two geometry slices associated with a frame of the point cloud data have a same slice ID; based on the two geometry slices having the same slice ID, restricting the two geometry slices to have a same content; and coding the point cloud data based on the restriction.

Clause 15. A method of coding point cloud data, the method comprising: determining whether two geometry slices are associated with a same frame; based on the two geometry slices being associated with the same frame, restricting the two geometry slices from having a same value of slice ID; and coding the point cloud data based on each slice ID.

Clause 16. A method of coding point cloud data, the method comprising: determining whether all points in a point cloud are associated with a respective unique point; based on all points in the point cloud being associated with a respective unique point, restricting slices from containing two points associated with a same position; and coding the point cloud data based on the restriction.

Clause 17. The method of clause 16, further comprising restricting signaling of a syntax element indicative of slices containing two points associated with the same position.

Clause 18. A method of coding point cloud data, the method comprising: determining color related syntax elements; signaling the color related syntax elements for color attributes; refraining from signaling the color related syntax elements for other purposes; and coding the point cloud data based on the color related syntax elements.

Clause 19. The method of clause 18, further comprising: determining whether known_attribute_label_flag is 0; based on known_attribute_label_flag being 0, not including known attributes in attribute_label_four_bytes.

Clause 20. The method of clause 18, further comprising only representing each attribute in attribute_label_four_bytes.

Clause 21. A method of coding point cloud data, the method comprising: determining whether an attribute dimension is greater than 1; based on the attribute dimension being greater than 1, signaling a flag in the attribute parameter set; and coding the point cloud data based on the flag.

Clause 22. The method of clause 21, further comprising restricting the value of the flag to not contradict the value of number of attribute dimensions signaled for the attribute.

Clause 23. A method of coding point cloud data, the method comprising: refraining from signaling region_qp_delta; signaling region_qp_delta_abs_minus1 and region_qp_delta_sign; and coding the point cloud data based on region_qp_delta_abs_minus1 and region_qp_delta_sign.

Clause 24. The method of clause 23, further comprising: determining a number of regions where deltaQP will be applied; and signaling a syntax element indicative of the number of regions where deltaQP will be applied.

Clause 25. A method of coding point cloud data, the method comprising: providing a common level of detail (LoD) parameter set (CPS); determining a LoD syntax element; and coding the point cloud data based on the LoD syntax element.

Clause 25.5 The method of clause 25, wherein based on the LoD syntax element equaling 2, all attributes to be coded with the LoD syntax element equaling 2, are coded with lifting scalability.

Clause 26. The method of clause 25, further comprising: determining whether an override flag is present in an attribute parameter set (APS); based on the override flag not being present in the APS, determining a common parameter set (CPS) parameters to be equal to corresponding APS parameters.

Clause 27. The method of clause 25 or 26, further comprising: determining attribute coding type and lifting scalability enabled flag to be equal for the APS and the CPS.

Clause 28. The method of any combination of clauses 25-27, further comprising signaling a CPS ID indicative of a CPS corresponding to an attribute.

Clause 29. The method of clause 28, wherein the CPS ID is in one of an APS or an attribute slice header (ASH).

Clause 30. The method of clause 28 or 29, further comprising: determining whether aps_lod_parameters_override_flag is equal to 0; and based on aps_lod_parameters_override_flag being equal to 0, signaling the CPS ID.

Clause 31. The method of any combination of clauses 25-30, further comprising: determining whether aps_lod_parameters_override_flag is not signaled; based on aps_lod_parameters_override_flag not being signaled, refraining from signaling APS parameters; and deriving parameters from the CPS for use with an attribute.

Clause 31.1 A method of coding point cloud data, the method comprising: determining whether more than one geometry slice is in a tile; based on more than one geometry slice being in a tile, restricting each geometry slice in the tile to refer to the same GPS; and coding the point cloud data based on the GPS.

Clause 31.2 A method of coding point cloud data, the method comprising: determining whether more than one attribute slice is in a tile; based on more than one attribute slice being in a tile, restricting each geometry slice in the tile to refer to the same GPS; and coding the point cloud data based on the GPS.

Clause 32. The method of any of clauses 1-31.2, further comprising generating the point cloud.

Clause 33. A device for processing a point cloud, the device comprising one or more means for performing the method of any of clauses 1-32.

Clause 34. The device of clause 33, wherein the one or more means comprise one or more processors implemented in circuitry.

Clause 35. The device of any of clauses 33 or 34, further comprising a memory to store the data representing the point cloud.

Clause 36. The device of any of clauses 33-35, wherein the device comprises a decoder.

Clause 37. The device of any of clauses 33-36, wherein the device comprises an encoder.

Clause 38. The device of any of clauses 33-37, further comprising a device to generate the point cloud.

Clause 39. The device of any of clauses 33-38, further comprising a display to present imagery based on the point cloud.

Clause 40. A computer-readable storage medium having stored thereon instructions that, when executed, cause one or more processors to perform the method of any of clauses 1-32.

Clause 41. A method of decoding point cloud data, the method comprising: determining dimensions of a region box; determining dimensions of a slice bounding box; and decoding a slice of the point cloud data associated with the slice bounding box, wherein the dimensions of the region box are constrained to not exceed the dimensions of the slice bounding box.

Clause 42. The method of clause 41, wherein the dimensions of the region box are constrained such that no point in the region box is outside the slice bounding box.

Clause 43. The method of clause 41 or 42, further comprising: determining a slice dimension; parsing a trisoup node size syntax element indicative of a size of a node coded with trisoup coding mode; and decoding the point cloud data based on the size of the node, wherein a value of the trisoup node size syntax element is constrained to not exceed the slice dimension.

Clause 44. The method of any combination of clauses 41-43, further comprising: parsing an attribute slice header syntax element indicative of a number of regions where a delta quantization parameter will be applied; and decoding the point cloud data based on the number of regions, wherein a value of the attribute slice header syntax element is constrained within a range of 0 to N, where N is a predetermined value.

Clause 45. The method of any combination of clauses 41-44, further comprising: parsing a geometry slice header syntax element indicative of a geometry parameter set identifier, wherein the value of the geometry slice header syntax element is restricted to be in a range of 0 to 15 inclusive, and wherein the decoding the point cloud data is further based on a geometry parameter set identified by the geometry parameter set identifier.

Clause 46. The method of any combination of clauses 41-45, further comprising: parsing an attribute slice header syntax element indicative of an attribute parameter set identifier, wherein the value of the attribute slice header syntax element is restricted to be in a range of 0 to 15 inclusive, and wherein the decoding the point cloud data is further based on an attribute parameter set identified by the attribute parameter set identifier.

Clause 47. A method of decoding point cloud data, the method comprising: determining a first slice identifier (ID) of a first geometry slice associated with a frame of the point cloud data; determining a second slice ID of a second geometry slice associated with the frame of the point cloud data; based on the second slice ID being equal to the first slice ID, determining the second slice to contain identical content to the first slice; and decoding the point cloud data based on the first slice ID.

Clause 48. The method of clause 47, further comprising: determining a slice dimension; parsing a trisoup node size syntax element indicative of a size of a node coded with trisoup coding mode; and decoding the point cloud data based on the size of the node, wherein a value of the trisoup node size syntax element is constrained to not exceed the slice dimension.

Clause 49. The method of clause 47 or 48, further comprising: parsing an attribute slice header syntax element indicative of a number of regions where a delta quantization parameter will be applied; and decoding the point cloud data based on the number of regions, wherein a value of the attribute slice header syntax element is constrained within a range of 0 to N, where N is a predetermined value.

Clause 50. The method of any combination of clauses 47-49, further comprising: parsing a geometry slice header syntax element indicative of a geometry parameter set identifier, wherein the value of the geometry slice header syntax element is restricted to be in a range of 0 to 15 inclusive, and wherein the decoding the point cloud data is further based on a geometry parameter set identified by the geometry parameter set identifier.

Clause 51. The method of any combination of clauses 47-50, further comprising: parsing an attribute slice header syntax element indicative of an attribute parameter set identifier, wherein the value of the attribute slice header syntax element is restricted to be in a range of 0 to 15 inclusive, and wherein the decoding the point cloud data is further based on an attribute parameter set identified by the attribute parameter set identifier.

Clause 52. A method of decoding point cloud data, the method comprising: determining whether an attribute dimension of an attribute is greater than 1; based on the attribute dimension being greater than 1, parsing an attribute slice header syntax element indicative of a delta quantization parameter; and decoding the point cloud data based on the delta quantization parameter.

Clause 53. The method of clause 52, wherein determining whether the attribute dimension is greater than 1 comprises parsing a syntax element in a sequence parameter set.

Clause 54. The method of clause 52 or 53, further comprising: determining a slice dimension; parsing a trisoup node size syntax element indicative of a size of a node coded with trisoup coding mode; and decoding the point cloud data based on the size of the node, wherein a value of the trisoup node size syntax element is constrained to not exceed the slice dimension.

Clause 55. The method of any combination of clauses 52-54, further comprising: parsing an attribute slice header syntax element indicative of a number of regions where the delta quantization parameter will be applied; and decoding the point cloud data based on the number of regions, wherein a value of the attribute slice header syntax element is constrained within a range of 0 to N, where N is a predetermined value.

Clause 56. The method of any combination of clauses 52-55, further comprising: parsing a geometry slice header syntax element indicative of a geometry parameter set identifier, wherein a value of the geometry slice header syntax element is restricted to be in a range of 0 to 15 inclusive, and wherein the decoding the point cloud data is further based on a geometry parameter set identified by the geometry parameter set identifier.

Clause 57. The method of any combination of clauses 52-56, further comprising: parsing an attribute slice header syntax element indicative of an attribute parameter set identifier, wherein a value of the attribute slice header syntax element is restricted to be in a range of 0 to 15 inclusive, and wherein the decoding the point cloud data is further based on an attribute parameter set identified by the attribute parameter set identifier.

Clause 58. A device for decoding point cloud data, the device comprising: memory configured to store the point cloud data; and one or more processors implemented in circuitry and coupled to the memory, the one or more processors being configured to: determine dimensions of a region box; determine dimensions of a slice bounding box;

and decode a slice of the point cloud data associated with the slice bounding box, wherein the dimensions of the region box are constrained to not exceed the dimensions of the slice bounding box.

Clause 59. The device of clause 58, wherein the dimensions of the region box are constrained such that no point in the region box is outside the slice bounding box.

Clause 60. The device of clause 58 or 59, wherein the one or more processors are further configured to: determine a slice dimension; parse a trisoup node size syntax element indicative of a size of a node coded with trisoup coding mode; and decode the point cloud data based on the size of the node, wherein a value of the trisoup node size syntax element is constrained to not exceed the slice dimension.

Clause 61. The device of any combination of clauses 58-60, wherein the one or more processors are further configured to: parse an attribute slice header syntax element indicative of a number of regions where the delta quantization parameter will be applied; and decode the point cloud data based on the number of regions, wherein a value of the attribute slice header syntax element is constrained within a range of 0 to N, where N is a predetermined value.

Clause 62. The device of any combination of clauses 58-61, wherein the one or more processors are further configured to: parse a geometry slice header syntax element indicative of a geometry parameter set identifier, wherein the value of the geometry slice header syntax element is restricted to be in a range of 0 to 15 inclusive, and wherein the one or more processors decode the point cloud data further based on a geometry parameter set identified by the geometry parameter set identifier.

Clause 63. The device of any combination of clauses 58-62, wherein the one or more processors are further configured to: parse an attribute slice header syntax element indicative of an attribute parameter set identifier, wherein the value of the attribute slice header syntax element is restricted to be in a range of 0 to 15 inclusive, and wherein the one or more processors decode the point cloud data further based on an attribute parameter set identified by the attribute parameter set identifier.

Clause 64. A device for decoding point cloud data, the device comprising: memory configured to store the point cloud data; and one or more processors implemented in circuitry and coupled to the memory, the one or more processors being configured to: determine a first slice identifier (ID) of a first geometry slice associated with a frame of the point cloud data; determine a second slice ID of a second geometry slice associated with the frame of the point cloud data; based on the second slice ID being equal to the first slice ID, determine the second slice to contain identical content to the first slice; and decode the point cloud data based on the first slice ID.

Clause 65. The device of clause 64, wherein the one or more processors are further configured to: determine a slice dimension; parse a trisoup node size syntax element indicative of a size of a node coded with trisoup coding mode; and decode the point cloud data based on the size of the node, wherein a value of the trisoup node size syntax element is constrained to not exceed the slice dimension.

Clause 66. The device of clause 64 or 65, wherein the one or more processors are further configured to: parse an attribute slice header syntax element indicative of a number of regions where a delta quantization parameter will be applied; and decode the point cloud data based on the number of regions, wherein a value of the attribute slice header syntax element is constrained within a range of 0 to N, where N is a predetermined value.

Clause 67. The device of any combination of clauses 64-66, wherein the one or more processors are further configured to: parse a geometry slice header syntax element indicative of a geometry parameter set identifier, wherein the value of the syntax element is restricted to be in a range of 0 to 15 inclusive, and wherein the one or more processors decode the point cloud data further based on a geometry parameter set identified by the geometry parameter set identifier.

Clause 68. The device of any combination of clauses 64-67, wherein the one or more processors are further configured to: parse an attribute slice header syntax element indicative of an attribute parameter set identifier, wherein the value of the attribute slice header syntax element is restricted to be in a range of 0 to 15 inclusive, and wherein the one or more processors decode the point cloud data further based on an attribute parameter set identified by the attribute parameter set identifier.

Clause 69. A device for decoding point cloud data, the device comprising: memory configured to store the point cloud data; and one or more processors implemented in circuitry and coupled to the memory, the one or more processors being configured to: determine whether an attribute dimension of an attribute is greater than 1; based on the attribute dimension being greater than 1, parse an attribute slice header syntax element indicative of a delta quantization parameter; and decode the point cloud data based on the delta quantization parameter.

Clause 70. The device of clause 69, wherein as part of determining whether the attribute dimension is greater than 1, the one or more processors are configured to parse a syntax element in a sequence parameter set.

Clause 71. The device of clause 69 or 70, wherein the one or more processors are further configured to: determine a slice dimension; parse a trisoup node size syntax element indicative of a size of a node coded with trisoup coding mode; and decode the point cloud data based on the size of the node, wherein a value of the trisoup node size syntax element is constrained to not exceed the slice dimension.

Clause 72. The device of any combination of clauses 69-71, wherein the one or more processors are further configured to: parse an attribute slice header syntax element indicative of a number of regions where a delta quantization parameter will be applied; and decode the point cloud data based on the number of regions, wherein a value of the attribute slice header syntax element is constrained within a range of 0 to N, where N is a predetermined value.

Clause 73. The device of any combination of clauses 69-72, wherein the one or more processors are further configured to: parse a geometry slice header syntax element indicative of a geometry parameter set identifier, wherein a value of the geometry slice header syntax element is restricted to be in a range of 0 to 15 inclusive, and wherein the one or more processors decode the point cloud data further based on a geometry parameter set identified by the geometry parameter set identifier.

Clause 74. The device of any combination of clauses 69-73, wherein the one or more processors are further configured to: parse an attribute slice header syntax element indicative of an attribute parameter set identifier, wherein a value of the attribute slice header syntax element is restricted to be in a range of 0 to 15 inclusive, and wherein the one or more processors decode the point cloud data further based on an attribute parameter set identified by the attribute parameter set identifier.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:
   determining a first slice identifier (ID) of a first geometry slice associated with a frame of the point cloud data, the first slice ID identifying the first geometry slice, wherein the first geometry slice comprises first content;
   determining a second slice ID of a second geometry slice associated with the frame of the point cloud data, the second slice ID identifying the second geometry slice, wherein the second geometry slice comprises second content;
   based on the second slice ID being equal to the first slice ID, determining that the second content is identical to the first content; and
   decoding the point cloud data based on the first content and the second content being identical.

2. The method of claim 1, further comprising:
   determining a slice dimension;
   parsing a trisoup node size syntax element indicative of a size of a node coded with trisoup coding mode; and
   decoding the point cloud data based on the size of the node,
   wherein a value of the trisoup node size syntax element is constrained to not exceed the slice dimension.

3. The method of claim 1, further comprising:
   parsing an attribute slice header syntax element indicative of a number of regions where a delta quantization parameter will be applied; and
   decoding the point cloud data based on the number of regions,
   wherein a value of the attribute slice header syntax element is constrained within a range of 0 to N, where N is a predetermined value.

4. The method of claim 1, further comprising:
   parsing a geometry slice header syntax element identifying a geometry parameter set,
   wherein a value of the geometry slice header syntax element is restricted to be in a range of 0 to 15 inclusive, and wherein the decoding the point cloud data is further based on a geometry parameter set identified by the geometry slice header syntax element.

5. The method of claim 1, further comprising:
   parsing an attribute slice header syntax element identifying an attribute parameter set,
   wherein a value of the attribute slice header syntax element is restricted to be in a range of 0 to 15 inclusive, and wherein the decoding the point cloud data is further based on an attribute parameter set identified by the attribute slice header syntax element.

6. A device for decoding point cloud data, the device comprising:
  memory configured to store the point cloud data; and
  one or more processors implemented in circuitry and coupled to the memory, the one or more processors being configured to:
    determine a first slice identifier (ID) of a first geometry slice associated with a frame of the point cloud data, the first slice ID identifying the first geometry slice, wherein the first geometry slice comprises first content;
    determine a second slice ID of a second geometry slice associated with the frame of the point cloud data, the second slice ID identifying the second geometry slice, wherein the second geometry slice comprises second content;
    based on the second slice ID being equal to the first slice ID, determine that the content is identical to the first content; and
    decode the point cloud data based on the first content and the second content being identical.

7. The device of claim 6, wherein the one or more processors are further configured to:
  determine a slice dimension;
  parse a trisoup node size syntax element indicative of a size of a node coded with trisoup coding mode; and
  decode the point cloud data based on the size of the node, wherein a value of the trisoup node size syntax element is constrained to not exceed the slice dimension.

8. The device of claim 6, wherein the one or more processors are further configured to:
  parse an attribute slice header syntax element indicative of a number of regions where a delta quantization parameter will be applied; and
  decode the point cloud data based on the number of regions,
  wherein a value of the attribute slice header syntax element is constrained within a range of 0 to N, where N is a predetermined value.

9. The device of claim 6, wherein the one or more processors are further configured to:
  parse a geometry slice header syntax element identifying a geometry parameter set,
  wherein a value of the geometry slice header syntax element is restricted to be in a range of 0 to 15 inclusive, and wherein the one or more processors decode the point cloud data further based on a geometry parameter set identified by the geometry slice header syntax element.

10. The device of claim 6, wherein the one or more processors are further configured to:
  parse an attribute slice header syntax element identifying an attribute parameter set,
  wherein a value of the attribute slice header syntax element is restricted to be in a range of 0 to 15 inclusive, and wherein the one or more processors decode the point cloud data further based on an attribute parameter set identified by the slice header syntax element.

11. The method of claim 1, wherein decoding the point cloud data comprises repeating the first geometry slice as the second geometry slice in the frame of the point cloud data.

12. The device of claim 6, wherein as part of decoding the point cloud data, the one or more processors are configured to repeat the first geometry slice as the second geometry slice in the frame of the point cloud data.

* * * * *